United States Patent
Asakura et al.

(10) Patent No.: US 9,019,208 B2
(45) Date of Patent: Apr. 28, 2015

(54) MOBILE COMMUNICATION TERMINAL, PROGRAM AND STATE DISPLAY METHOD

(75) Inventors: Hirohito Asakura, Kodama-gun (JP); Kengo Tamura, Kodama-gun (JP)

(73) Assignee: Lenovo Innovations Limited (Hong Kong), Quarry Bay (HK)

( * ) Notice: Subject to any disclaimer, the term of this patent is extended or adjusted under 35 U.S.C. 154(b) by 201 days.

(21) Appl. No.: 12/674,725

(22) PCT Filed: Jun. 18, 2009

(86) PCT No.: PCT/JP2009/061105
§ 371 (c)(1),
(2), (4) Date: Feb. 23, 2010

(87) PCT Pub. No.: WO2010/007851
PCT Pub. Date: Jan. 21, 2010

(65) Prior Publication Data
US 2011/0122069 A1    May 26, 2011

(30) Foreign Application Priority Data

Jul. 16, 2008  (JP) ................................ 2008-184995
Jul. 28, 2008  (JP) ................................ 2008-193200

(51) Int. Cl.
*G06F 3/02*  (2006.01)
*H04B 1/38*  (2006.01)
*H04M 1/22*  (2006.01)
*H04M 1/02*  (2006.01)

(52) U.S. Cl.
CPC .............. *H04M 1/22* (2013.01); *H04M 1/0245* (2013.01)

(58) Field of Classification Search
CPC ........................................................ H04M 1/22
USPC .................................... 345/169, 170; 455/566
See application file for complete search history.

(56) References Cited

U.S. PATENT DOCUMENTS

| | | | |
|---|---|---|---|
| 6,667,731 B2 * | 12/2003 | Park ............................... | 345/102 |
| 7,120,471 B2 * | 10/2006 | Deeds ........................... | 455/566 |
| 2002/0021276 A1 | 2/2002 | Park | |
| 2002/0025829 A1 * | 2/2002 | Kitatani ........................ | 455/550 |
| 2004/0022047 A1 * | 2/2004 | Okayasu ........................ | 362/23 |
| 2004/0171410 A1 | 9/2004 | Deeds | |
| 2004/0198455 A1 * | 10/2004 | Deeds ........................... | 455/566 |

(Continued)

FOREIGN PATENT DOCUMENTS

| | | | |
|---|---|---|---|
| JP | 10-145475 A | 5/1998 | |
| JP | 2001175229 A | 6/2001 | |

(Continued)

OTHER PUBLICATIONS

International Search Report for PCT/JP2009/061105 mailed Jul. 14, 2009.

(Continued)

*Primary Examiner* — Lun-Yi Lao
*Assistant Examiner* — Ibrahim Khan
(74) *Attorney, Agent, or Firm* — Sughrue Mion, PLLC

(57) ABSTRACT

A state display device includes: a key operating section which receives input from a user; light sources which are formed by an R lighting element, a G lighting element, and a B lighting element, and which are provided in the vicinity of the key operating section; and a control unit which controls the lighting of each one of the RGB lighting elements of the light sources.

17 Claims, 18 Drawing Sheets

(56) References Cited

U.S. PATENT DOCUMENTS

| | | | |
|---|---|---|---|
| 2007/0018961 A1* | 1/2007 | Jeong | 345/170 |
| 2007/0139384 A1* | 6/2007 | Okayasu | 345/170 |
| 2007/0243911 A1* | 10/2007 | Saito | 455/575.1 |

FOREIGN PATENT DOCUMENTS

| | | |
|---|---|---|
| JP | 2001217904 A | 8/2001 |
| JP | 2002-125067 A | 4/2002 |
| JP | 2002101195 A | 4/2002 |
| JP | 2002-171346 A | 6/2002 |
| JP | 2003060745 A | 2/2003 |
| JP | 2003316496 A | 11/2003 |
| JP | 2005045350 A | 2/2005 |
| JP | 2005134998 A | 5/2005 |
| JP | 2005136955 A | 5/2005 |
| JP | 2006520125 A | 8/2006 |
| JP | 2007-150549 A | 6/2007 |
| JP | 2007150549 A | 6/2007 |

OTHER PUBLICATIONS

Japanese Office Action for JP2008-193200 mailed on Oct. 3, 2012.
European search report for EP09797779.7 dated Jan. 8, 2013.
Japanese Office Action for JP Application No. 2008-184995 mailed on Apr. 16, 2013 with English Translation.

* cited by examiner

FIG. 2A
FIG. 2B
FIG. 2C
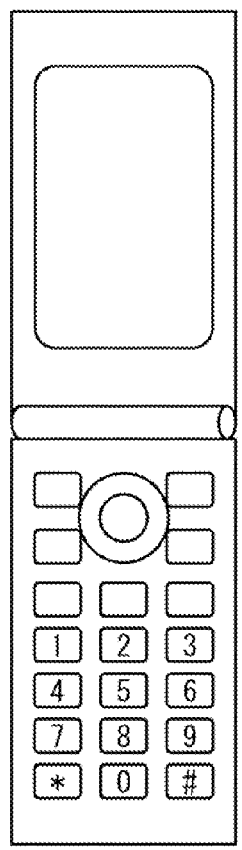
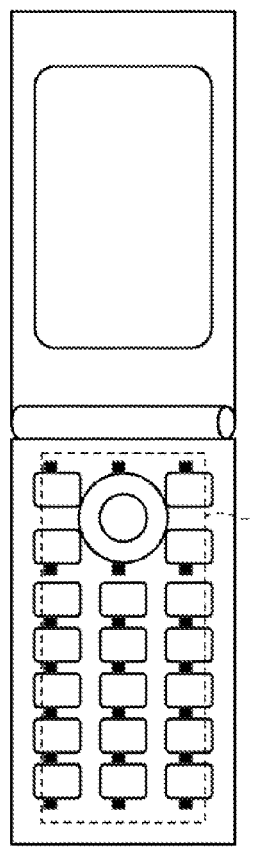
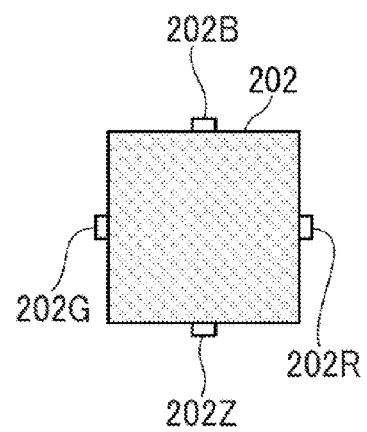

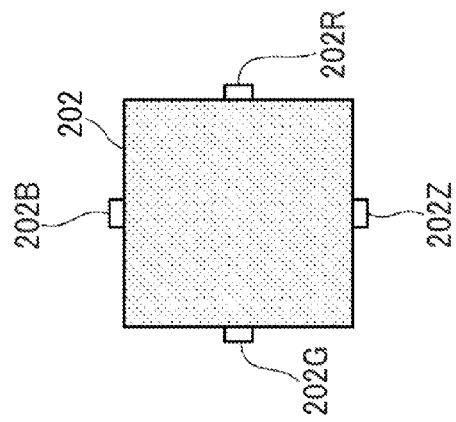
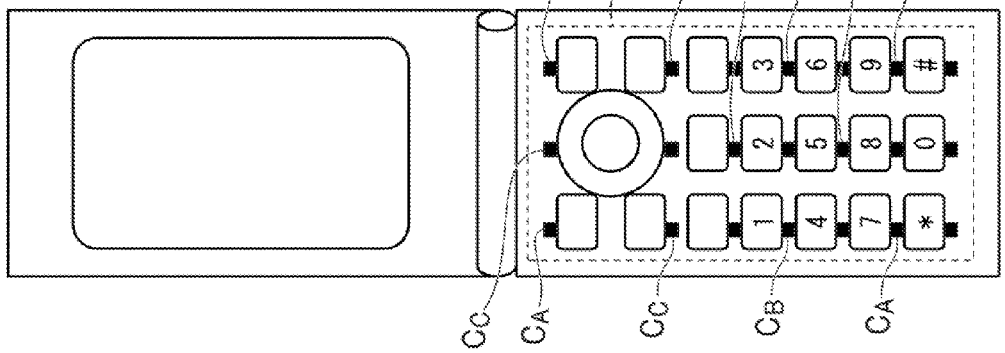
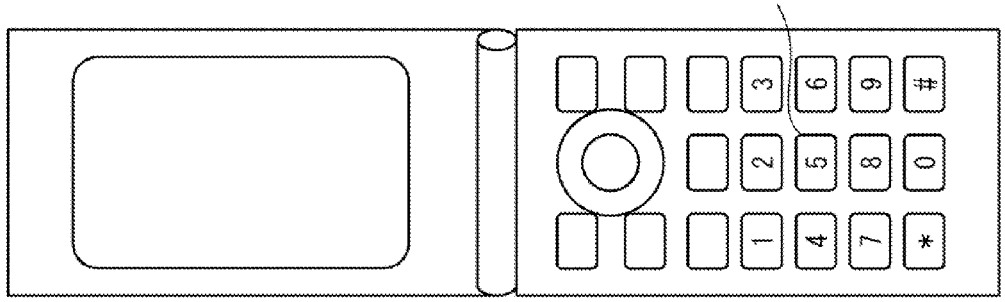

FIG. 10A

| SETTING STATE | KEY ILLUMINATION LIGHTING PATTERN |
|---|---|
| KEY ILLUMINATION, WHITE | ALL WHITE LIGHTING |
| KEY ILLUMINATION, YELLOW | ALL YELLOW LIGHTING |
| KEY ILLUMINATION, BLUE | ALL BLUE LIGHTING |
| KEY ILLUMINATION, RED | ALL RED LIGHTING |
| KEY ILLUMINATION, GRADATION | ALL GRADATION LIGHTING |
| ... | ... |

FIG. 10B

| MOBILE TELEPHONE STATE | LIGHTING PATTERN |
|---|---|
| PRESS INPUT KEY 501 | GUIDANCE LIGHTING PATTERN A |
| PRESS INPUT KEY 502 | GUIDANCE LIGHTING PATTERN B |
| PRESS INPUT KEY 503 | GUIDANCE LIGHTING PATTERN C |
| PRESS INPUT KEY 504 | GUIDANCE LIGHTING PATTERN D |
| PRESS INPUT KEY 505 | GUIDANCE LIGHTING PATTERN E |
| PRESS INPUT KEY 506 | GUIDANCE LIGHTING PATTERN F |
| ... | ... |
| PRESS INPUT KEY 517 | SWITCH BETWEEN (1)(2)AND(3) AT 0.1 SECOND INTERVALS<br>(1) SET KEY BACKLIGHT 617 TO YELLOW<br>(2) SET KEY BACKLIGHT 617 TO BLUE<br>(3) SET KEY BACKLIGHT 617 TO OFF |
| ENGAGED | REPEAT SWITCHING BETWEEN (1)(2)AND(3) AT 1 SECOND INTERVALS<br>(1) LIGHTING AND LIGHTING PATTERN 1<br>(2) LIGHTING AND LIGHTING PATTERN 2<br>(3) LIGHTING AND LIGHTING PATTERN 3 |
| ... | ... |
| INFRARED COMMUNICATION PROGRESS STATE 25% | LIGHTING PATTERN P (25) |
| INFRARED COMMUNICATION PROGRESS STATE 50% | LIGHTING PATTERN P (50) |
| INFRARED COMMUNICATION PROGRESS STATE 75% | LIGHTING PATTERN P (75) |
| INFRARED COMMUNICATION PROGRESS STATE 100% | LIGHTING PATTERN P (100) |
| ... | ... |

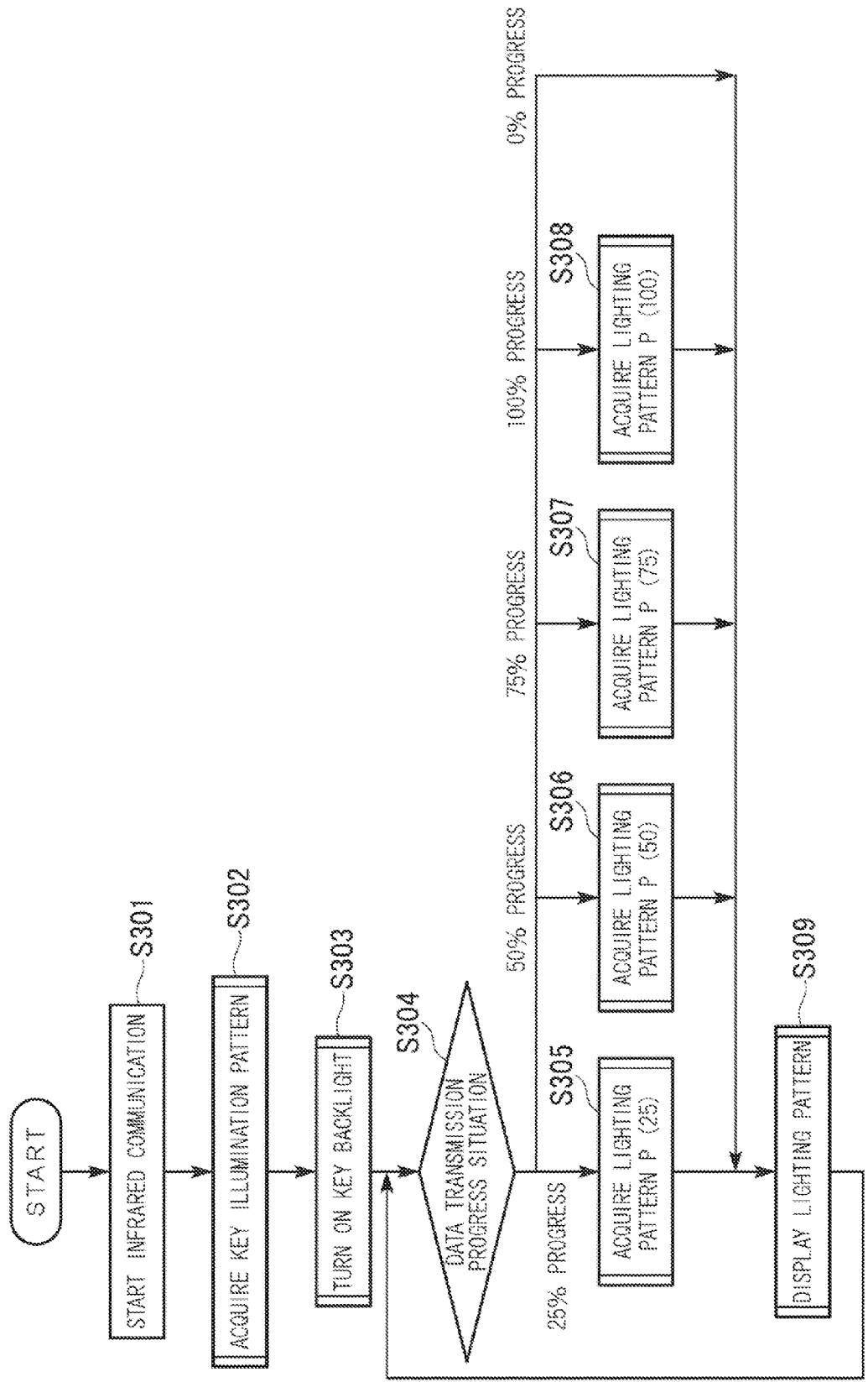

FIG. 12A

| | COLOR |
|---|---|
| KEY BACKLIGHT 601 | — |
| KEY BACKLIGHT 602 | — |
| KEY BACKLIGHT 603 | — |
| KEY BACKLIGHT 604 | — |
| KEY BACKLIGHT 605 | — |
| KEY BACKLIGHT 606 | — |
| KEY BACKLIGHT 607 | — |
| KEY BACKLIGHT 608 | — |
| KEY BACKLIGHT 609 | — |
| KEY BACKLIGHT 610 | YELLOW |
| KEY BACKLIGHT 611 | YELLOW |
| KEY BACKLIGHT 612 | YELLOW |
| KEY BACKLIGHT 613 | — |
| KEY BACKLIGHT 614 | — |
| ... | ... |
| KEY BACKLIGHT 624 | — |

FIG. 12B

| | COLOR |
|---|---|
| KEY BACKLIGHT 601 | — |
| KEY BACKLIGHT 602 | — |
| KEY BACKLIGHT 603 | — |
| KEY BACKLIGHT 604 | — |
| KEY BACKLIGHT 605 | — |
| KEY BACKLIGHT 606 | — |
| KEY BACKLIGHT 607 | YELLOW |
| KEY BACKLIGHT 608 | YELLOW |
| KEY BACKLIGHT 609 | YELLOW |
| KEY BACKLIGHT 610 | YELLOW |
| KEY BACKLIGHT 611 | YELLOW |
| KEY BACKLIGHT 612 | — |
| KEY BACKLIGHT 613 | — |
| KEY BACKLIGHT 614 | — |
| ... | ... |
| KEY BACKLIGHT 624 | — |

FIG. 12C

| | COLOR |
|---|---|
| KEY BACKLIGHT 601 | — |
| KEY BACKLIGHT 602 | — |
| KEY BACKLIGHT 603 | — |
| KEY BACKLIGHT 604 | YELLOW |
| KEY BACKLIGHT 605 | YELLOW |
| KEY BACKLIGHT 606 | YELLOW |
| KEY BACKLIGHT 607 | YELLOW |
| KEY BACKLIGHT 608 | YELLOW |
| KEY BACKLIGHT 609 | YELLOW |
| KEY BACKLIGHT 610 | YELLOW |
| KEY BACKLIGHT 611 | YELLOW |
| KEY BACKLIGHT 612 | — |
| KEY BACKLIGHT 613 | — |
| KEY BACKLIGHT 614 | — |
| ... | ... |
| KEY BACKLIGHT 624 | — |

FIG. 12D

| | COLOR |
|---|---|
| KEY BACKLIGHT 601 | BLUE |
| KEY BACKLIGHT 602 | BLUE |
| KEY BACKLIGHT 603 | BLUE |
| KEY BACKLIGHT 604 | BLUE |
| KEY BACKLIGHT 605 | BLUE |
| KEY BACKLIGHT 606 | BLUE |
| KEY BACKLIGHT 607 | BLUE |
| KEY BACKLIGHT 608 | BLUE |
| KEY BACKLIGHT 609 | BLUE |
| KEY BACKLIGHT 610 | BLUE |
| KEY BACKLIGHT 611 | BLUE |
| KEY BACKLIGHT 612 | BLUE |
| KEY BACKLIGHT 613 | — |
| KEY BACKLIGHT 614 | — |
| ... | ... |
| KEY BACKLIGHT 624 | — |

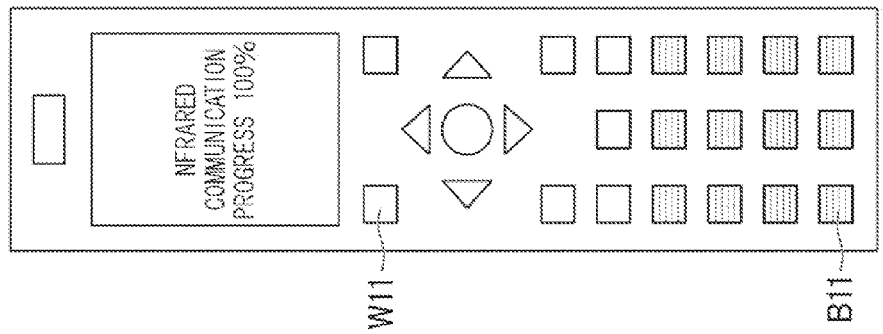
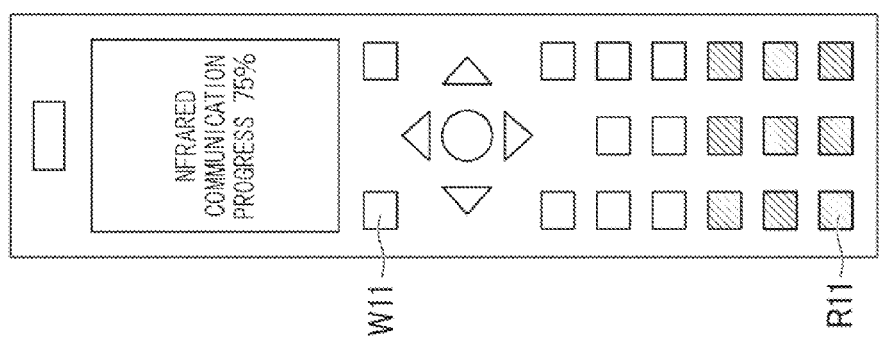
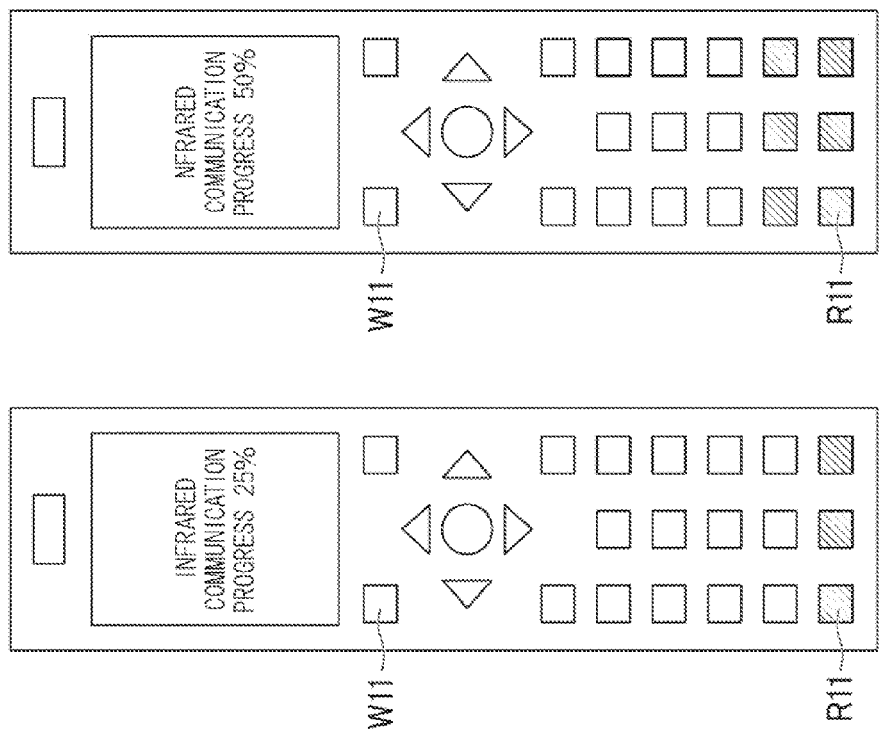

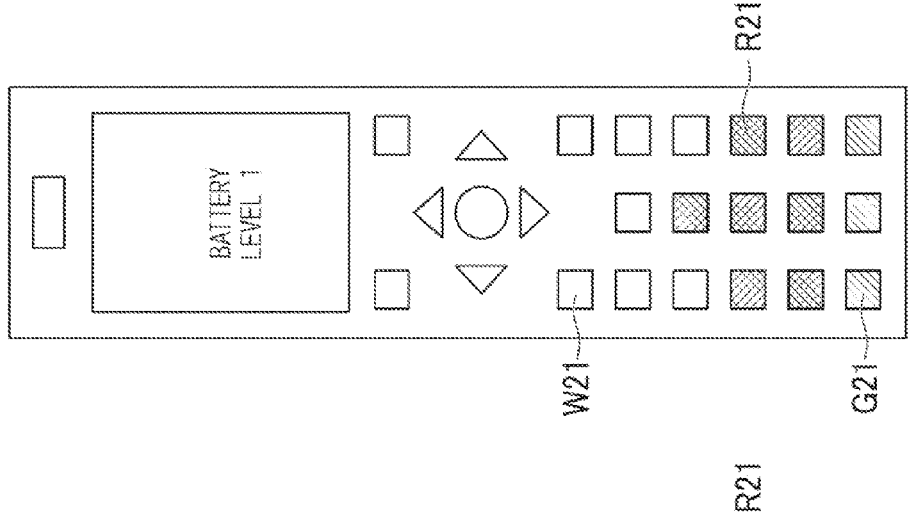
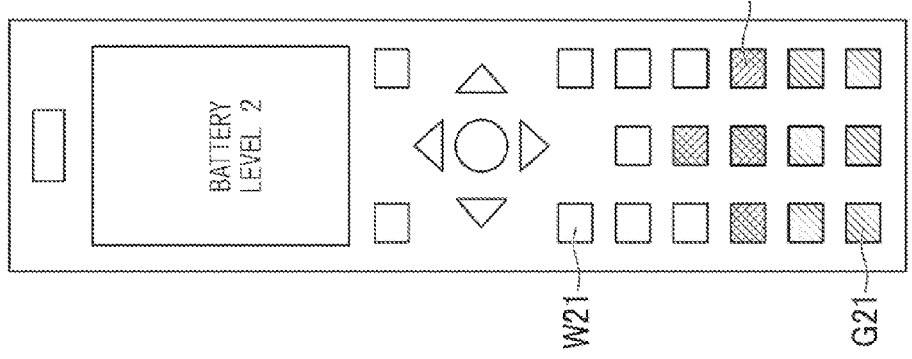
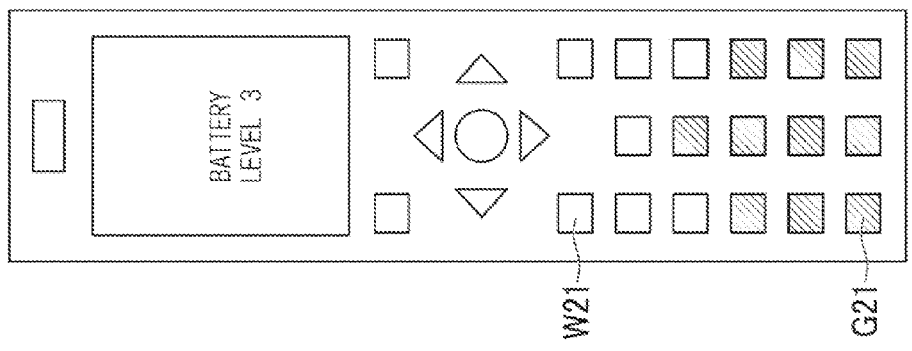

FIG. 15A
FIG. 15B
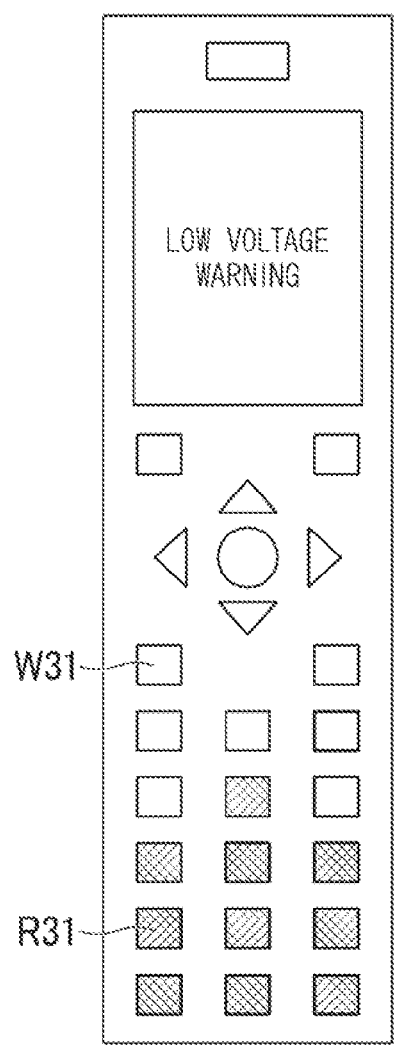
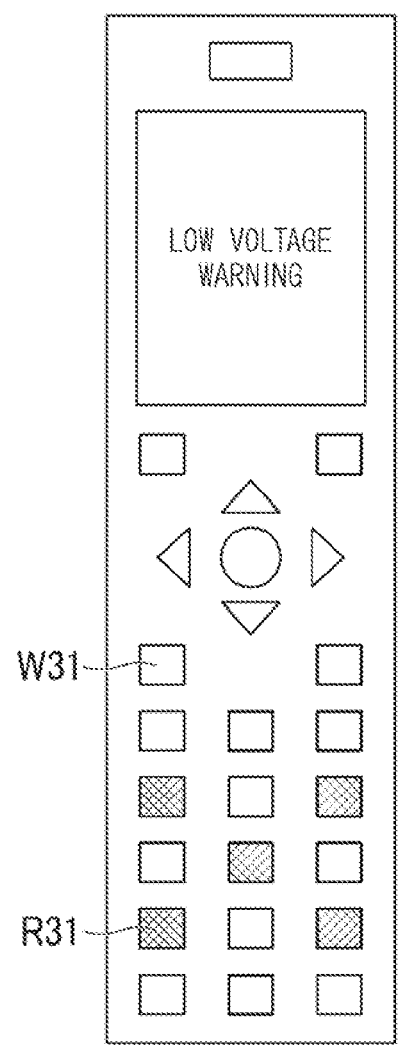

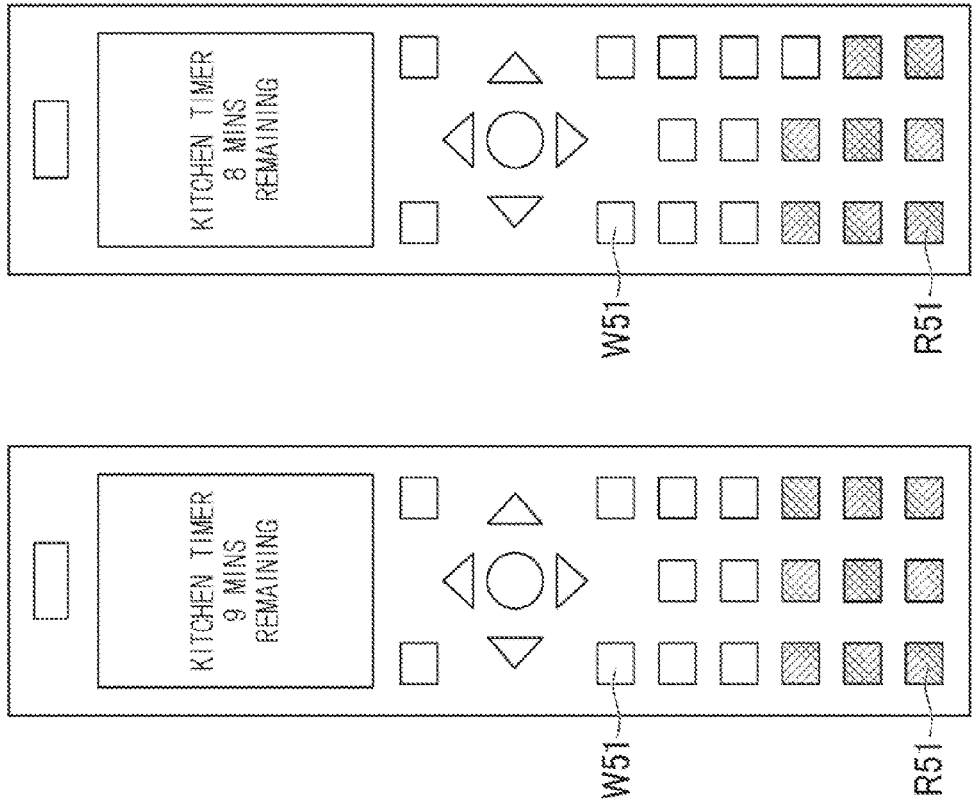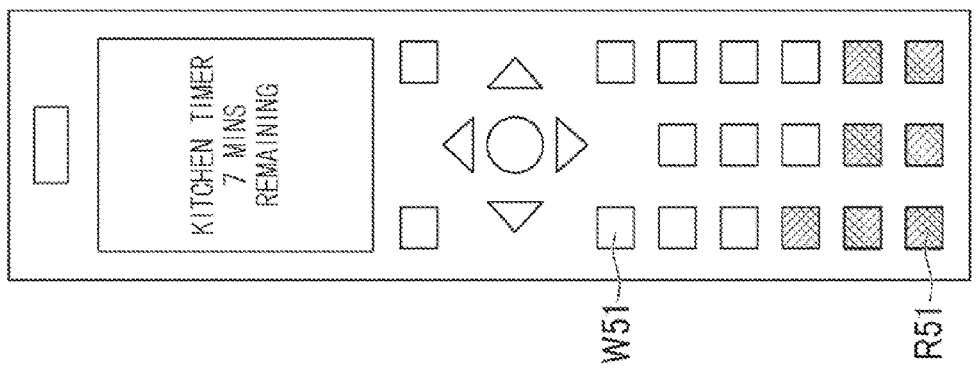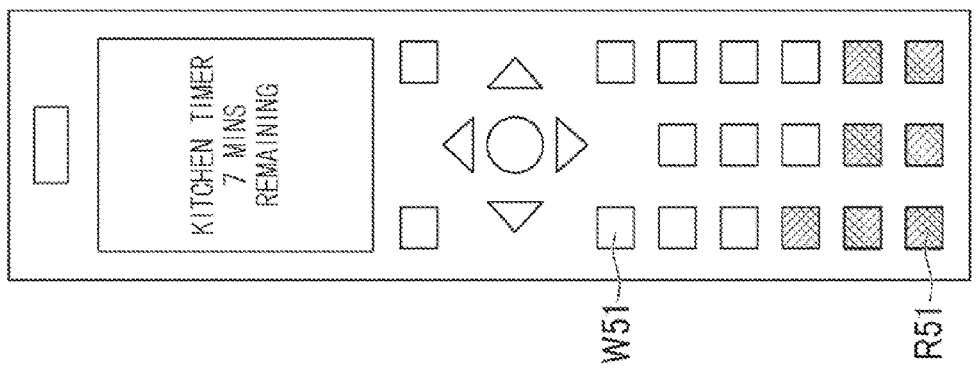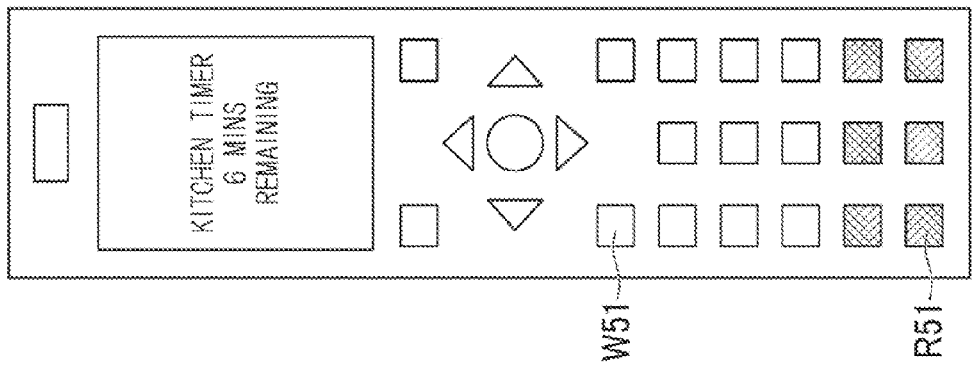

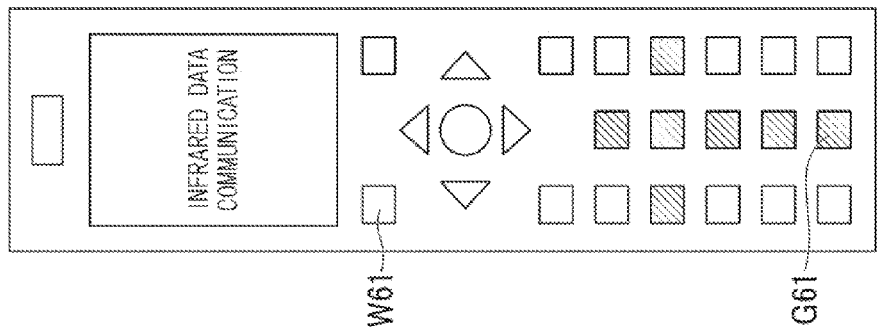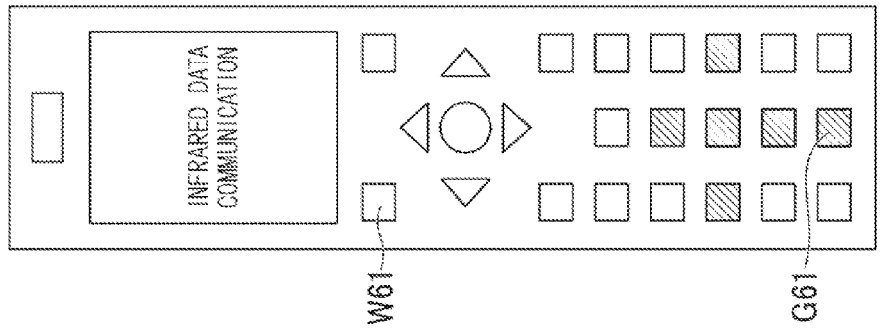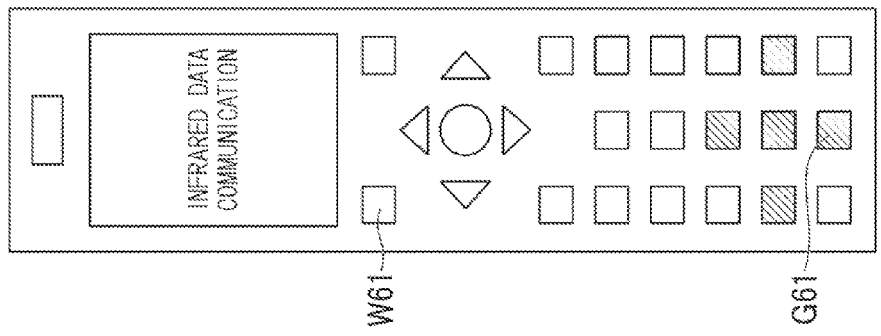

MOBILE COMMUNICATION TERMINAL, PROGRAM AND STATE DISPLAY METHOD

The present application is the National Phase of PCT/JP2009/061105, filed Jun. 18, 2009, which claims priority based on Japanese Patent Application Nos. 2008-184995, filed Jul. 16, 2008 in Japan and 2008-193200, filed Jul. 28, 2008 in Japan, the contents of which are incorporated herein by reference.

TECHNICAL FIELD

The present invention relates to a mobile terminal device, a program, and a state display method.

BACKGROUND ART

Designs which are able to satisfy the tastes of a mixture of diverse users are continually being sought in modern mobile telephones. These designs may come in various forms, for example, mobile telephones are now designed in various types of exterior shape, color, and the like. In addition, straight, fold-open, and slide designs and the like are also available. In addition to these designs, it is also possible for a mobile phone to be lit up using a key backlight provided in a key operating section, for example, in order to satisfy the tastes of users (see, for example, Patent Document 1).

However, the aforementioned key backlight in a mobile phone described in Patent Document 1 is formed by a monochrome light, and there is no catering for individual tastes. Namely, it is not possible to adjust the settings of the color or lighting method of the key backlight of a mobile telephone in order to satisfy the preferences of a user.

Moreover, among mobile devices having a key backlight function which illuminates the key, input section, mobile devices that enable a plurality of input keys to be individually lit up or left unlit have also been proposed. For example, the mobile terminal disclosed in Patent Document 2 causes a green LED or a red LED to be lit up or left unlit in a predetermined lighting pattern in accordance with the remaining battery charge.

Moreover, the mobile telephone disclosed in Patent Document 3 has a multi-color light emitting portion which illuminates a plurality of keys from the rear, and the plurality of keys are controlled such that they are lit up or left unlit in accordance with the operation of the mobile telephone. Furthermore, the communication device disclosed in Patent Document 4 imparts various items of state information to a user using a plurality of backlight patterns.

In the aforementioned state display method which utilizes a key backlight function, the remaining battery charge and state of the communication device and the like can be displayed using a backlight pattern. However, the keys which are not lit up by the backlight pattern are not illuminated so that the fundamental function of the key backlight cannot be obtained.

Patent Document 1: Japanese Patent Application, First Publication No. 2002-101195

Patent Document 2: Japanese Patent Application, First Publication No. H10-145475

Patent Document 3: Japanese Patent Application, First Publication No. 2001-217904

Patent Document 4: Japanese Patent Application, First Publication No. 2006-520125

DISCLOSURE OF INVENTION

Problem to be Solved by the Invention

The present invention was conceived in view of the above described circumstances and it is an object thereof to provide a mobile communication terminal, a program, and a state display method that allow settings to be made in accordance with the tastes of a user, and that have an improved degree of freedom over monochrome individual backlights.

It is a further object of the present invention to provide a mobile communication terminal, a program, and a state display method that make it possible for a state to be displayed while the keys remain illuminated.

Means for Solving the Problem (1) A state display device according to an aspect of the present invention comprising: a key operating section which receives input from a user; light sources which are formed by an R lighting element, a G lighting element, and a B lighting element, and which are provided in the vicinity of the key operating section; and a control unit which controls the lighting of each one of the RGB lighting elements of the light sources.

(2) In the state display device according to an aspect of the present invention, it is also possible for there to be provided an open/closed detection section which detects that the state of a housing has changed, and when the open/closed detection section detects a change in the state of the housing of the state display device, for the control unit to control the lighting of the light sources.

(3) In the state display device according to an aspect of the present invention, it is also possible for the control unit to cause the light sources to be lit based on lighting pattern data which controls the RGB lighting elements of the light sources in accordance with inputs received by the key operating section,.

(4) In the state display device according to an aspect of the present invention, it is also possible for there to be provided: a communication section which communicates with an external server device; a storage section which stores lighting pattern data; and a download section which downloads from the external server device via the communication section to the server device lighting pattern data which controls the lighting of the RGB lighting elements of the light sources, and for the control unit to cause the light sources to be lit based on the lighting pattern data downloaded by the download section and stored in the storage section.

(5) In the state display device according to an aspect of the present invention, it is also possible for a plurality of the light sources to be provided, and for the plurality of light sources to be arranged in accordance with the layout of the keys of the key operating section.

(6) A state display device according to an aspect of the present invention is a mobile communication terminal having a key backlight function, which includes: a plurality of colored light emitting portions that are capable of individually illuminating each one of a plurality of keys; and a control unit which, when the state display device is in a predetermined operating state, then when the plurality of keys have been illuminated by the plurality of colored light emitting portions being lit in a uniform color, causes the colored light emitting portions to change to a different color from the uniform color in accordance with a state display lighting pattern which corresponds to the operating state.

(7) In the state display device according to an aspect of the present invention, it is also possible for the control unit to control the colored light emitting portions such that at least one of the shape and the color of the state display lighting patterns changes in accordance with the operating state.

(8) In the state display device according to an aspect of the present invention, it is also possible for the control unit to control the colored light emitting portions such that at least one of the shape and the color of the state display lighting patterns changes over time in accordance with changes in the operating state.

(9) In the state display device according to an aspect of the present invention, it is also possible for there to be further provided: a lighting pattern storage section in which are stored key illumination patterns which are used to illuminate the plurality of keys in a uniform color, and a plurality of state display lighting patterns which illuminate one or more keys in a predetermined color and shape so as to correspond to each of the plurality of operating states of the state display device, and for the control unit to control the colored light emitting portions using the state display lighting patterns and the key illumination patterns stored in the lighting pattern storage section.

(10) A mobile communication terminal according to an aspect of the present invention comprising: a communication section which communicates with an external device; a key operating section which receives input from a user; light sources which are formed by an R lighting element, a G lighting element, and a B lighting element, and which are provided in the vicinity of the key operating section; and a control unit which controls the lighting of each one of the RGB lighting elements of the light sources in accordance with the communication state of the communication section.

(11) A mobile communication terminal according to an aspect of the present invention comprising: a communication section which communicates with an external device; a plurality of colored light emitting portions that are capable of individually illuminating each one of a plurality of keys; and a control unit which, when the plurality of keys are being illuminated as a result of the plurality of colored light emitting portions being lit in a uniform color, causes the colored light emitting portions to change to a different color from the uniform color in accordance with a state display lighting pattern which corresponds to the communication state of the communication section.

(12) A program according to an aspect of the present invention executes on a computer of a mobile communication terminal: a key operating step in which input is received from a user; and a control step in which lighting of each one of RGB lighting elements of light sources which are formed by an R lighting element, a G lighting element, and a B lighting element, and which are provided in the vicinity of the key operating section is controlled.

(13) A mobile communication terminal according to an aspect of the present invention executes on a computer of a mobile communication terminal having a key backlight function:
a control step in which, when the state display device is in a predetermined operating state, then when a plurality of keys are being illuminated as a result of a plurality of colored light emitting portions that are capable of individually illuminating each one of the plurality of keys being lit in a uniform color, the colored light emitting portions are changed to a different color from the uniform color in accordance with a state display lighting pattern which corresponds to the operating state.

(14) A state display method according to an aspect of the present invention is a state display method which uses a mobile communication terminal, comprising: a key operating step in which input is received from a user; and a control step in which lighting of each one of RGB lighting elements of light sources which are each formed by an R lighting element, a G lighting element, and a B lighting element, and which are provided in the vicinity of the key operating section is controlled.

(15) A state display method according to an aspect of the present invention is a state display device which uses a mobile communication terminal having a key backlight function, comprising: a control step in which, when the state display device is in a predetermined operating state, then when a plurality of keys are being illuminated as a result of a plurality of colored light emitting portions that are capable of individually illuminating each one of the plurality of keys being lit in a uniform color, the colored light emitting portions are changed to a different color from the uniform color in accordance with a state display lighting pattern which corresponds to the operating state.

Effect of the Invention

As has been described above, according to the present invention, light sources which are formed by an R lighting element, a G lighting element, and a B lighting element are provided in the vicinity of the key operating section, and the lighting of each one of the RGB lighting elements of the light sources is controlled by a control unit.

As a result, it is possible to cause a key backlight to be lit in a desired color so that, compared with when monochrome backlights are lit, the key backlight can be lit in a variety of patterns.

Moreover, because the light sources are able to emit light in each one of the RGB colors, light can be emitted (i.e., illumination can be achieved) using a variety of colors in accordance with the combination of the lighting states of each one of the RGB lighting elements.

According to the present invention, states can be displayed while keys remain illuminated.

BRIEF DESCRIPTION OF THE DRAWINGS

FIG. 2A is a schematic diagram showing a fold-open type of mobile telephone 1 in an open state.

FIG. 2B is a schematic diagram showing a fold-open type of mobile telephone 1 in an open state.

FIG. 2C is a diagram showing a layout of lights forming a key backlight.

FIG. 4A is a schematic diagram showing a fold-open type of mobile telephone in an open state.

FIG. 4B is a schematic diagram showing a fold-open type of mobile telephone in an open state.

FIG. 4C is a diagram showing a layout of lights forming a key backlight.

FIG. 10A is a typical view showing an example of a list of key illumination lighting patterns stored in ROM.

FIG. 10B is a typical view showing an example of a list of state display lighting patterns stored in ROM.

FIG. 11 is a flowchart showing an example of state displays during a data transmission in infrared communication performed by a mobile telephone.

FIG. 12A is a view showing an example of a data table which corresponds to the state of progress of infrared communication.

FIG. 12B is a view showing an example of a data table which corresponds to the state of progress of infrared communication.

FIG. 12C is a view showing an example of a data table which corresponds to the state of progress of infrared communication.

FIG. 12D is a view showing an example of a data table which corresponds to the state of progress of infrared communication.

FIG. 13A is a view showing an example of a lighting pattern which shows the state of progress of infrared communication.

FIG. 13B is a view showing an example of a lighting pattern which shows the state of progress of infrared communication.

FIG. 13C is a view showing an example of a lighting pattern which shows the state of progress of infrared communication.

FIG. 13D is a view showing an example of a lighting pattern which shows the state of progress of infrared communication.

FIG. 14A is a view showing an example of a lighting pattern which displays a battery level.

FIG. 14B is a view showing an example of a lighting pattern which displays a battery level.

FIG. 14C is a view showing an example of a lighting pattern which displays a battery level.

FIG. 15A is a view showing an example of a lighting pattern which displays a low voltage warning.

FIG. 15B is a view showing an example of a lighting pattern which displays a low voltage warning.

FIG. 17A is a view showing an example of a lighting pattern which displays a remaining time of a kitchen timer.

FIG. 17B is a view showing an example of a lighting pattern which displays a remaining time of a kitchen timer.

FIG. 17C is a view showing an example of a lighting pattern which displays a remaining time of a kitchen timer.

FIG. 17D is a view showing an example of a lighting pattern which displays a remaining time of a kitchen timer.

FIG. 18A is a view showing an animation which shows that infrared communication is currently being performed.

FIG. 18B is a view showing an animation which shows that infrared communication is currently being performed.

FIG. 18C is a view showing an animation which shows that infrared communication is currently being performed.

BEST MODE FOR CARRYING OUT THE INVENTION

A mobile telephone serving as the mobile communication terminal of the respective embodiments of the present invention will now be described with reference made to the drawings.

(First Embodiment)

Figure 1:
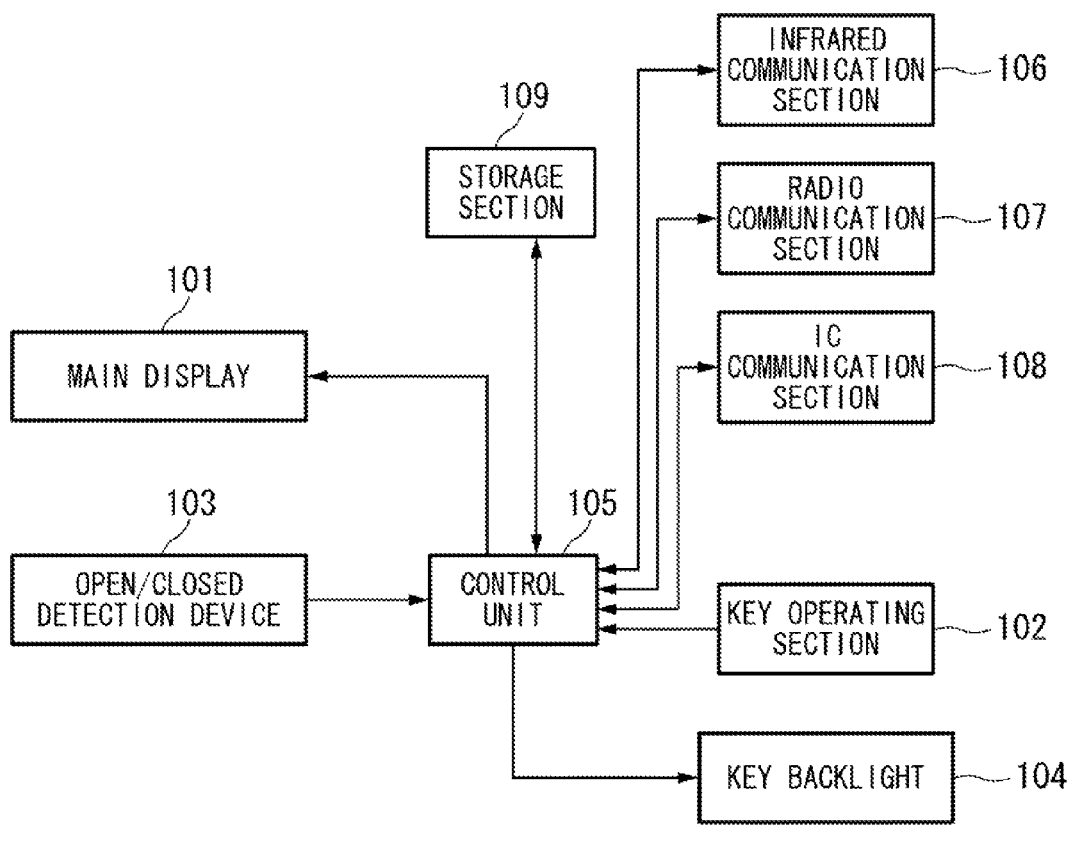
FIG. 1 is a schematic block diagram showing the structure of a mobile telephone 1 having a key backlight according to a first embodiment of the present invention.

FIG. 1 is a schematic block diagram showing the structure of a mobile telephone 1 having a key backlight according to a first embodiment of the present invention.

The mobile telephone 1 is provided with a user interface in the form of a main display 101, a key operating section 102, and an open-closed detection device 103 (also referred to as an open-closed detection portion). For example, a hole IC may be used for the open-closed detection device 103. When the mobile telephone 1 is in a closed state, magnets which are provided therein are in mutually facing positions. The hole IC detects that the state of the mobile telephone 1 has changed from a closed state to an open state based on whether or not these magnets are within a predetermined distance from each other. The result of this detection is output from the open-closed detection device 103 to a control unit 105 as a signal showing that the state of the mobile telephone 1 has converted to an open state. This open-closed detection device 103 detects that the state of the housing of the mobile telephone 1 has changed. For example, if the mobile telephone 1 is a fold-open type, the open-closed detection device 103 detects that the mobile telephone 1 has opened up from a folded shut state. Moreover, if the mobile telephone 1 is a slide type, the open-closed detection device 103 detects that the mobile telephone 1 has been slid open.

A key backlight 104 (also referred to as light sources) is formed by placing a plurality of light sources on a bottom surface of the key operating section 102 (i.e., on an interior side of the main body), and illuminates the key operating section 104 from the rear surface side.

The control units 105 controls the lighting of the key backlight 104, and controls the display of the main display 101. The control unit 105 controls the lighting of the individual light sources (RGB) of the key backlight 104 in accordance with lighting patterns stored in a storage section 109.

The mobile telephone 1 is also provided with a radio communication section 107, an infrared communication section 106, and an IC communication section 108. The radio communication section 107 performs data communication between the mobile telephone 1 and a network server. The infrared communication section 106 performs data communication between mobile telephones and other transmission/reception terminals using infrared. The radio communication section 107 performs communication with an IC chip.

Note that the infrared communication section 106, the radio communication section 107, and the IC communication section 108 may also be referred to as a communication section or download section.

The storage section 109 stores lighting pattern data. This lighting pattern data is data which controls the lighting pattern of the key backlight. The lighting pattern is data which controls the respective lighting elements of the RGB light sources so as to cause these respective lighting elements to be lit up or not lit up, and to control their brightness when they are lit up, and to control the length of time for which they are lit up. This lighting pattern data is read by the control unit 105.

FIG. 2A and FIG. 2B are schematic drawings showing a fold-open type of mobile telephone 1 in an opened state. The mobile phone 1 is provided with keys on which are inscribed characters such as 1, 2, 3, 4, 5, 6, 7, 8, 9, 0, *, and # (see FIG. 2A). In addition, a key backlight 104 is provided in the vicinity of the respective buttons of the mobile telephone 1 (see FIG. 2B).

FIG. 2C shows the layout of a light 202 which is used to form the key backlight 104. A key backlight 104 is formed by the plurality of lights 202. Each light 202 is provided with a lighting element 202R, a lighting element 202G, a lighting element 202B, and a power supply terminal 202Z. The lighting element 202R is a light source which emits red (R) light. The lighting element 202G is a light source which emits green (G) light. The lighting element 202B is a light source which emits blue (B) light.

Terminals of the lighting elements 202R, 202G, and 202B of the corresponding light 202 are connected to the respective terminals of the control unit 105. The power supply terminal 202Z receives power supplied from the control unit 105 or from a battery inside the mobile telephone 1, and supplies this power to the respective lighting elements 202R, 202G, and 202B.

The brightness and light-up time of the lighting elements 202R, 202G, and 202B can be set as is desired by a user from predetermined patterns using the control unit 105. In accordance with the set contents, the brightness and light-up time of the lighting elements 202R, 202G, and 202B are controlled by the control unit 105. These set contents are stored in the storage section 109 as lighting pattern data.

Here, the layout of the packaging positions of the lights 202 which make up the key backlight 104 as well as the number thereof can be freely altered in accordance with packaging conditions such as the surface area and the like. In this embodiment, an example is described in which a total of 21 lights 202 (i.e., 3 horizontal lights×7 vertical lights) are arranged in the mobile telephone 1 (see FIG. 2B).

Figure 3:
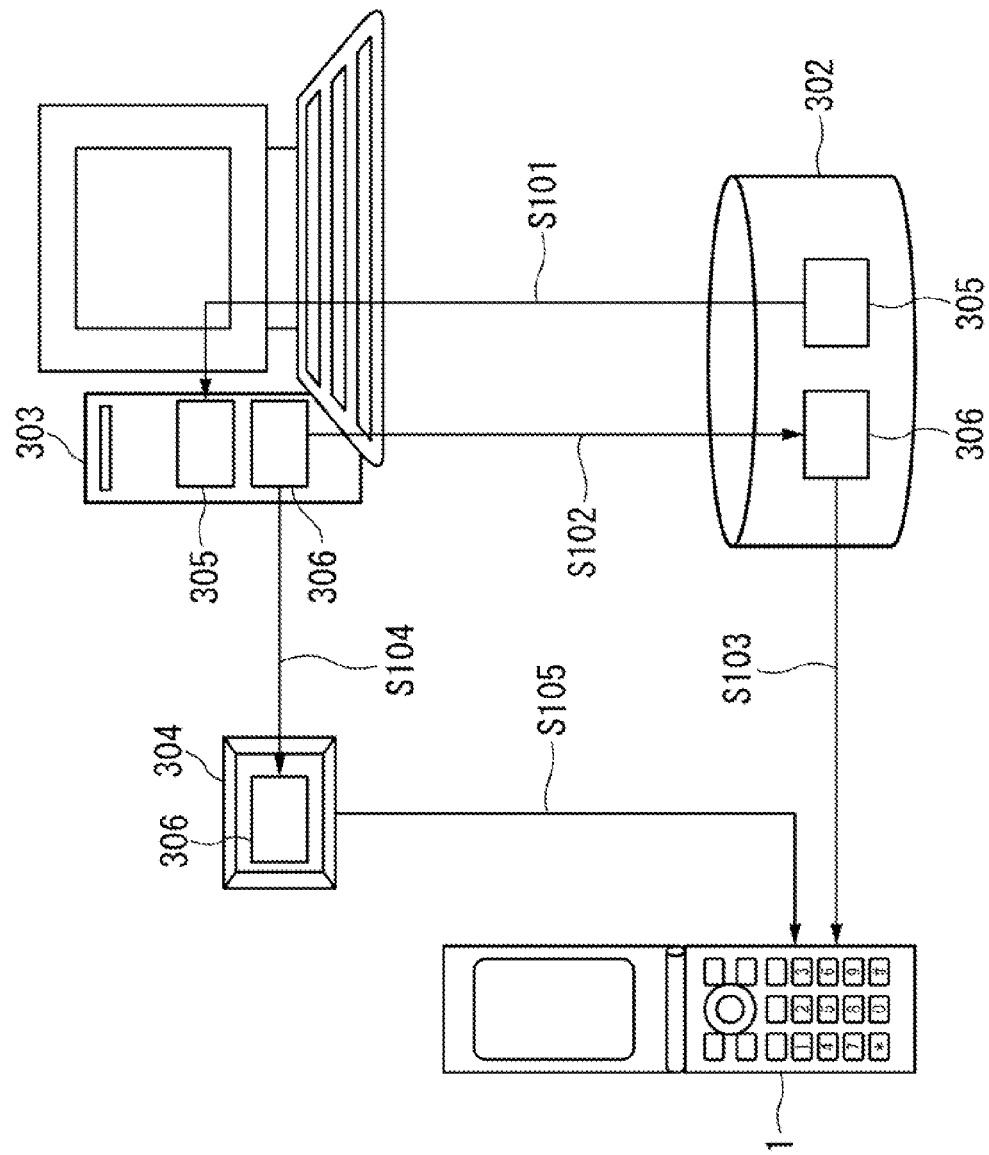
FIG. 3 is a drawing illustrating a process in which a user creates a lighting pattern, and then transmits the data thereof to a mobile telephone.

FIG. 3 is a view illustrating a process in which a user creates a lighting pattern, and then transmits the data thereof to the mobile telephone 1. Here, a database 302 and a PC 303 are connected together via a communication network such as the Internet or the like. The PC 303 and the mobile telephone 1 are connected together via a communication network. In addition, the mobile telephone 1 reads data stored on a recording medium 304, and also downloads data from the database 302.

Firstly, the PC 303 accesses the database 302 over a network based on commands input from the user via an input device such as a keyboard or the like. The PC 303 then downloads a key illumination creation tool 305 from the database 302 via the communication network (step S101).

This key illumination creation tool 305 (i.e., lighting pattern data creation section) is a tool (i.e., a program) which, when it is executed on the PC 303, enables a user to select a key backlight lighting pattern. After the user has downloaded the key illumination creation tool 305, the user executes the key illumination creation tool 305 on the PC 303, and creates lighting pattern data as key illumination contents 306.

Once the key illumination contents 306 have been created using the key illumination creation tool 305, the key illumination contents 306 are uploaded to the database 302 on the network (step S102).

The key illumination contents 306 which have been uploaded to the database 302 are then downloaded to the mobile telephone 1 (step S103).

Here, the mobile telephone 1 accesses the server device holding the database 302 using the radio communication section 107, and then downloads the lighting pattern data.

Note that it is also possible for the key illumination contents 306 to be transmitted to the recording medium 304 (step S104), and for the key illumination contents 306 to then be downloaded by the mobile telephone 1 (step S105).

Next, the lighting control for the key backlight will be described.

If the respective lights 202 which make up the key backlight 104 are independently controlled, then PWM (Pulse Width Modulation) control is one example of the control method which may be used by the control unit 105. Each light 202 is formed by the three RGB lighting elements 202R, 202G, and 202B. The respective terminals of the control unit 105 are connected to the respective terminals of the lighting elements 202R, 202G, and 202B of the lights 202.

The brightness and light-up time of the lighting elements 202R, 202G, and 202B can be arbitrarily set using the control unit 105, and the lighting elements 202R, 2026, and 202B are controlled so as to be lit up in accordance with the set brightness and light-up time. Each light 202 can be lit up in a desired color in accordance with the brightness ratios of each one of the lighting elements 202R, 202G, and 202B making up the light 202. Namely, it is possible to portray a plurality of colors made up of a mixture of RGB colors using a single light 202. The control unit 105 independently controls all of the lights 202 which make up the key backlight. As a result, it is possible to achieve a lighting pattern which can easily be freely set.

FIG. 4A and FIG. 4B are schematic views showing a fold-open type of mobile telephone 1 in an open state. The mobile telephone 1 is provided with keys on which are inscribed characters such as 1, 2, 3, 4, 5, 6, 7, 8, 9, 0, *, #, and the like (see FIG. 4A). Moreover, a key backlight 104 is provided in the vicinity of the respective buttons of the mobile telephone 1 (see FIG. 4B). FIG. 4C shows a layout of a light 202 which is used to make up the key backlight 104.

FIG. 4B shows an example of a lighting pattern of the key backlight 104. A plurality of lights 202 (for example, RGB LED) are arranged on the key backlight 104 which shines onto the key operating section 102 of the mobile telephone 1. Each of the lights 202 can be independently controlled. Here, for example, a color $C_A$ (for example, red), a color $C_B$ (for example, yellow), a color $C_C$ (for example, green), a color $C_D$ (for example, blue), and a color $C_E$ (for example, purple) of each light are determined by the brightness proportions of each of the RGB of the light 202. Because each light 202 is independently controlled, each light can be lit by a different color (here, the colors $C_A$, $C_B$, $C_C$, $C_D$, and $C_E$), at a different brightness, and at a different lighting timing. As a result, it is possible to achieve key backlight control which has a high degree of freedom.

In FIG. 4B, in a light 202 which is made up of seven rows and three columns, the light in the first row of the first column is lit in the color $C_A$. In addition, the light in the second column of the first row is lit in the color $C_C$. The light in the third column of the first row is lit in the color $C_E$. The light in the first column of the second row is lit in the color $C_C$. The light in the third column of the second row is lit in the color $C_C$. The light in the second column of the third row is lit in the color $C_B$. The light in the first column of the fourth row is lit in the color $C_B$. The light in the third column of the fourth row is lit in the color $C_B$. The light in the second column of the fifth row is lit in the color $C_A$. The light in the first column of the sixth row is lit in the color $C_A$. Moreover, the light in the third column of the sixth row is lit in the color $C_A$.

Next, a scenario in which independent lighting of the key backlight (i.e., key illumination) is used will be described.

(1) Key illumination which is linked to the opening and closing of a fold-open type of mobile telephone will now be described. In the present embodiment, the key backlight 104 is lit up in a variety of lighting patterns when the housing is opened, and the key backlight 104 is used for illumination.

The lighting pattern which is lit up when the housing is opened can be arbitrarily set by a user. A user is able to enjoy the set illumination each time they open the mobile telephone housing. The user is also able to set the lighting pattern to suit their own personal taste. These lighting patterns can also be randomly set. In this case, the lighting pattern is randomly selected from among previously prepared lighting patterns each time the housing is opened, and the illumination lighting can then be performed in accordance with the selected lighting pattern. After the illumination lighting has ended, key operation can be performed and the control unit 105 switches to lighting that makes the key characters (i.e., the numbers and symbols on the buttons) easy to see (for example, each light 202 may be lit in a uniform color).

Next, key illumination lighting patterns (i.e., lighting patterns that can be achieved through the independent control of the key backlight) will be described. Among these lighting patterns are, for example, the patterns (1B) to (5B) described below.

(1B) Moving lighting is performed. For example, settings of the number of frames per second can be altered so as to achieve a moving lighting pattern.

(2B) The entire screen is lit with the same color. Because it is possible to set the respective RGB brightnesses, it is possible to set various colors using color blending.

(3B) Lighting is performed by gradation. For example, it is possible to employ settings in which the colors and brightnesses of adjacent lights change smoothly and continuously.

(4B) Lighting is performed at random. For example, the colors and brightnesses of each light are selected at random.

(5B) Lighting is performed such that pictures (i.e., icons), numbers, and alphabetical characters are expressed. For example, shapes may be expressed by selecting lighting locations.

As a practical example of the above described (1B) through (5B), an example of gradation lighting having movement will be described using the above-described (1B).

Gradation lighting is performed in a red color moving gradually from the top portion of the keys (i.e., from the vicinity of the operating keys), and gradation lighting is performed in a blue color moving gradually from the bottom portion of the keys (i.e., from the vicinity of the 0 numerical key). The moving gradations of red and blue become mixed together in a central portion of the keys (i.e., in the vicinity of the 2 numerical key), and gradually changed to a purple color (i.e., the red and blue are lit together). As a result, a moving gradation is expressed.

When creating lighting patterns, although a variety of types of lighting are possible using independent control, in the same way as the design of the mobile telephone, the lighting patterns depend on the likes and dislikes of the user. Here, in order to appeal to the various tastes of users, the setting methods described in (1C) and 2(C) below may be employed.

(1C) Several lighting patterns which have been determined by the production designers as optimum pre-installs for the mobile telephone are prepared, and the user is able to select and set one of these.

(2C) An environment in which a user is able to create a lighting pattern is prepared (for example, a key illumination creation tool is downloaded onto a PC), and a lighting pattern which is unique to that user can be set.

The environment for creating a lighting pattern may be one in which the lighting pattern is prepared in an application layer of the mobile telephone, or one in which an environment is prepared for creating a lighting pattern using key illumination creation tool software on a PC. As is described in FIG. 3, key illumination contents 306 are created on the PC 303, and the key illumination contents 306 are downloaded to the mobile telephone 1 via a communication line. As another example, it is also possible to store the key illumination contents 306 on the mobile telephone 1 using the recording medium 306.

An environment is provided in which data for the created lighting pattern is made public on the Internet, so that it can be downloaded by users other than the creators.

It is also possible for the following additional functions to be included. In order to ensure that the functions of a key backlight are always available, if a key is pressed while an illumination pattern is lit, the illumination is stopped and the pattern switches to a lighting pattern which makes key characters (i.e., the number and symbol buttons) easier to see. For example, the brightness of the lights 202 may be dimmed, and the colors of each light 202 may be made the same over the entire screen. The lighting pattern can be set such that, by adjusting (i.e., mixing) the RGB colors, the color that is used when the entire screen is made the same color while lit is set to one of a number of colors. The above measure is implemented in order to prevent the key portions flickering intensely and making the key characters hard to see while the keys are illuminated. When a user presses a key and it is determined that the user is performing a key operation, the illumination lighting is stopped even if the illumination lighting is partway through a lighting routine.

In this way, in the above described embodiment, it is possible for a user to enjoy the key backlight 104 as a key illumination, and a backlight function is also provided in order to illuminate the key characters in a dark location.

Next, an example of the implementation of key illumination lighting will be given.

In the case of a slide-type of mobile telephone, the key illumination lighting which accompanies the opening and closing of the mobile telephone 1 is performed in conjunction with the placement of the mobile phone in a state in which the key portion is visible (i.e., in an open state). In addition to this type of phone, even if the mobile telephone has a special shape, when the mobile phone is unfolded to a state in which the key portion is visible to the outside, the key illumination lighting is performed in conjunction with this.

Another method which may be used in addition to employing RGB lights involves independently controlling monochrome lights so as to provide illumination. In this case, the coloring effect is not as vivid as when the RGB lights are controlled independently, however, because the number of lights can be increased, it becomes possible to achieve extremely expressive illumination. Moreover, because monochrome lights are less expensive than RGB lights, a larger number of lights can be used for the key backlight. In this case, by using a combination of lit up and not lit up lights, pictures (i.e., icons), numbers, and characters can be represented in detail.

It is also possible for the key illumination to be lit while the mobile telephone 1 is performing various types of illumination. In this embodiment, it is possible to light up the key illumination during the transmission or reception of infrared data, the transmission or reception of mail, the transmission or reception of a voice call, the downloading of data from a network, or communication with an IC chip, and at the moment when the respective communication has ended to perform illumination lighting notifying that this communication has ended.

(1D) A description will now be given of when key illumination is performed during a mail transmission. For example, after a user has created a mail, the key illumination is turned on at the time when the transmission button is pressed. Once the mail transmission has been completed, a vivid illumination is lit up notifying that the transmission has been completed. This is effective because the key portion is in a visible state (i.e., is in an open state) during a mail transmission so that the key illumination lighting is easily visible to the user.

(2D) A description will now be given of when key illumination is performed during infrared communication. For example, the key illumination is lit up when address book data is being exchanged between two mobile telephones or when various contents (such as still images, movies, melodies and the like) are being transmitted and received. The key illumination on the transmitting side is set to a lighting pattern indicating a transmitting state. Examples of this lighting are shown in FIGS. 5A through 5C.

Figure 5A:
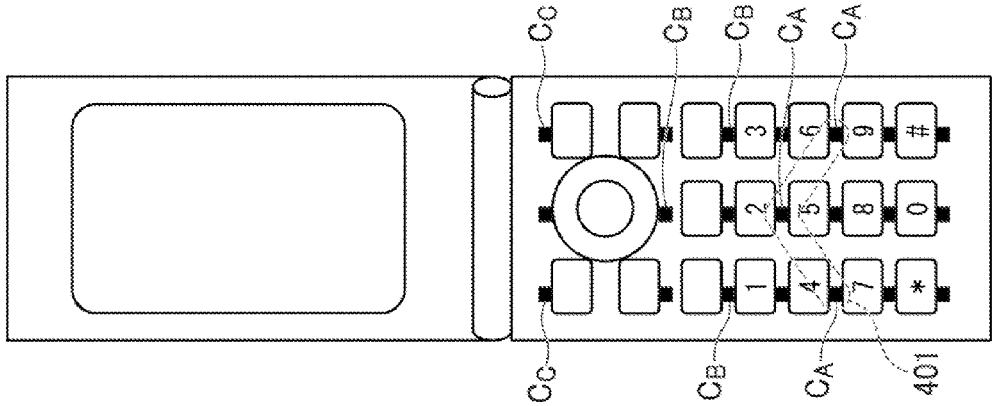
FIG. 5A is a drawing showing a lit state of a mobile telephone.
Figure 5B:
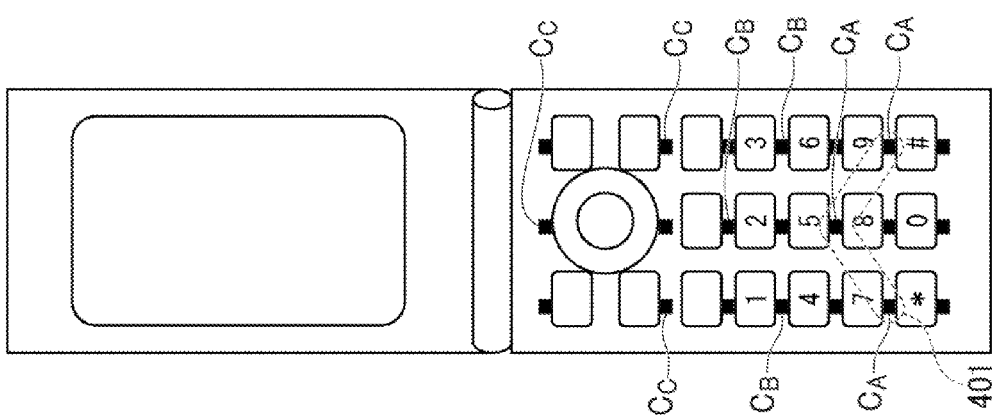
FIG. 5B is a drawing showing a lit state of a mobile telephone several hundred milliseconds after the state shown in FIG. 5A.
Figure 5C:
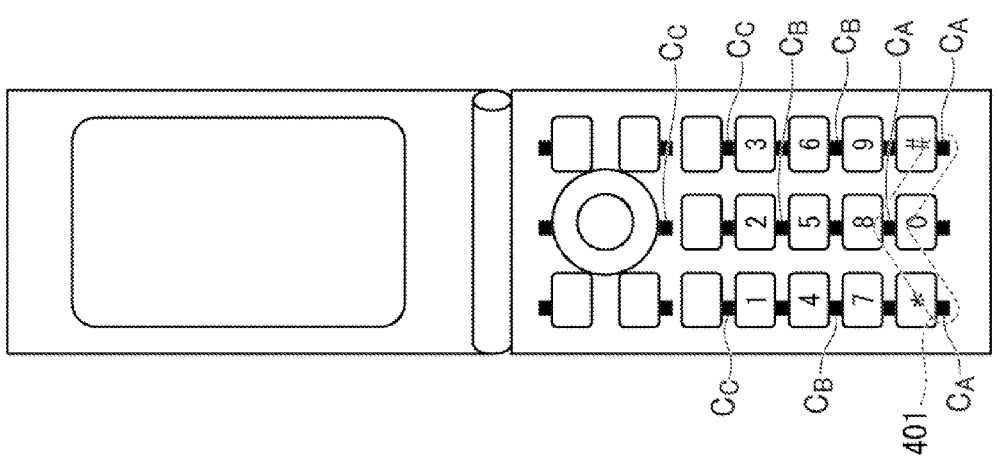
FIG. 5C is a drawing showing a lit state of a mobile telephone several hundred milliseconds after the state shown in FIG. 5B.

FIG. 5A shows the mobile telephone 1 in a lit up state. FIG. 5B shows a lit up state of the mobile telephone 1 several hundred milliseconds after the state shown in FIG. 5A. FIG. 5C shows a lit up state of the mobile telephone 1 several hundred milliseconds after the state shown in FIG. 5B.

Lights representing an arrow 401 travelling from the bottom portion of the keys (i.e., the vicinity of the 0 numerical key) towards the top portion of the keys are lit up. Namely, one of the key illuminations is lit so as to depict the shape of an arrow, and each time that a fixed time elapses, this arrow is displayed lit up so as to appear to move (i.e., to travel) towards the mobile telephone side of the receiving side.

Specifically, in a mobile telephone 1 provided with lights arranged in seven rows and three columns, firstly, the light in the seventh row of the first column, the light in the sixth row of the second column, and the light in the seventh row of the third column are each lit up in the color $C_A$ in the shape of an arrow 401 (see FIG. 5A).

Several hundred milliseconds after the state shown in FIG. 5A, the light in the sixth row of the first column, the light in the fifth row of the second column, and the light in the sixth row of the third column are each lit up in the color $C_A$ (see FIG. 5B).

Several hundred milliseconds after the state shown in FIG. 5B, the light in the fifth row of the first column, the light in the fourth row of the second column, and the light in the fifth row of the third column are each lit up in the color $C_A$ (see FIG. 5C).

In addition to this, a pattern may be used in which a plurality of arrows are lit up using gradation representation. The lighting of the arrows is achieved by selecting lights to light up from among the arrayed lights so as to represent shapes. Because several frames flash on and off each second, it is also possible to alter the lit up positions.

Once transmission is complete, a vivid illumination is lit up notifying that the communication has been completed.

In the same way, a lighting pattern showing a receiving state is used in the mobile telephone on the receiving side. When data is being exchanged between users, in order for the illumination of one user to appeal to another user with whom they are communicating, the user is able to employ key illumination as a method of expressing their own individuality.

(3D) A description will now be given of when key illumination lighting is performed when the power of a mobile telephone is turned on.

When the power of a mobile telephone 1 is turned on, key illumination lighting is performed in conjunction with this. When the power of the mobile telephone 1 is turned on, a wakeup message is displayed on the main display screen so that the fact that the power has been turned on is displayed. Here, key illumination lighting is performed in conjunction with the message display on the main display screen. The key illumination is lit up in a moving lighting pattern and is used for an entertainment effect when the power is turned on. In the same way, when the power is turned off, key illumination lighting is performed.

As has been described above, in the present embodiment, a plurality of RGB lights which make up a key backlight are each independently controlled. As a result, each light can be set individually to the desired levels of color, brightness, and lighting time, so that an illumination function can be obtained and improved.

Moreover, in the present embodiment, a plurality of lights (for example, RGB LED) which make up a backlight are used for the key backlight which illuminates the key operating section 102 of the mobile telephone 1, and each light can be independently controlled. Moreover, each light has each one of the respective RGB color elements, and each light can be lit to the desired color and brightness using the respective RGB brightness settings. By placing these lights on the rear side of the key operating section 102, the colors, brightnesses, and lighting timings of each light can be independently controlled so that a high degree of freedom can be used when key backlight control is being performed. A practical example of this is that, when the housing is opened up, the key backlight can be made to flash vividly and can be used as a key illumination. Settings for the key illumination can be altered under predetermined conditions in accordance with the tastes of the user.

In this manner, it is possible to provide a mobile telephone in which the key backlight is formed by RGB elements which enables lighting to be performed in the desired colors and at the desired timings.

Moreover, according to the present embodiment, it is possible to achieve key illumination lighting which lights up when the mobile telephone 1 is opened up.

Moreover, according to the present embodiment, users are able to create and light up original key illumination patterns in accordance with their own tastes.

Moreover, according to the present embodiment, key illuminations created by a third party can be downloaded to a mobile telephone 1.

(Second Embodiment)

Figure 6:
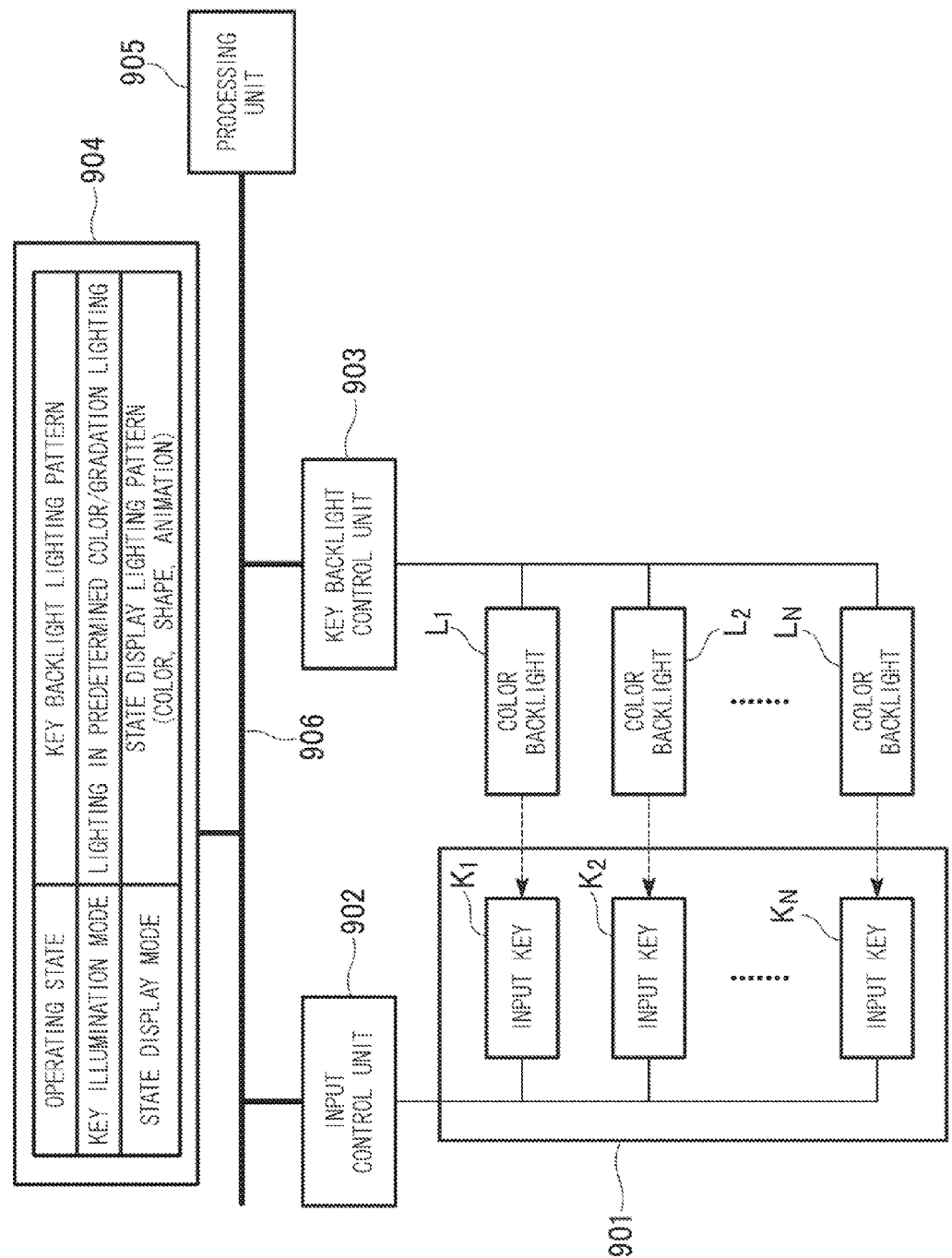
FIG. 6 is a block diagram showing the schematic functional structure of a state display device according to a second embodiment of the present invention.

FIG. 6 is a block diagram showing the schematic functional structure of a state display device according to a second embodiment of the present invention. This state display device is a mobile communication terminal such as a mobile telephone or the like. Here, a state display device of a mobile instrument in which a plurality of input keys $K_1$ through $K_N$ of an operating section 901 are individually illuminated by respective color backlights $L_1$ through $L_N$ is used as an example. The input keys $K_1$ through $K_N$ may include, for example, a 10-key and an enter key and the like. Each of the color backlights $L_1$ through $L_N$ is formed, for example, by RGB light emitting diodes (LED), and a plurality of predetermined colors can be emitted by adjusting the respective intensities of the RGB lights.

The input keys $K_1$ through $K_N$ are connected to an input control unit 902. The color backlights $L_1$ through $L_N$ are connected to a key backlight control unit 903. The input control unit 902, the key backlight control unit 903, and a lighting pattern list memory 904 are connected via a bus 906 to a processing unit 905, and, as is described below, are controlled by the processing unit 905. The processing unit 905 is a program control processor such as, for example, a CPU (central processing unit). The processing unit 905 executes a state display operation according to the present embodiment (described below) by reading and executing a program from a memory (not shown) in which the program is stored.

In the lighting pattern list memory 904 is stored a list of key backlight lighting patterns which correspond to an operating state or to the state of progress of an operation. In key illumination mode, it is possible for a lighting pattern which illuminates all of the input keys $K_1$ through $K_N$ in a predetermined color or in a gradation of a predetermined color to be selected. In state display mode, it is possible for lighting patterns which illuminate colors, shapes, and animations of these to be selected. As is described below, the processing unit 905 selects a lighting pattern, and outputs the selected lighting pattern to the key backlight control unit 903. As a result of this, the processing unit 905 lights up the color backlights $L_1$ through $L_N$ in the relevant lighting pattern.

Figure 7:
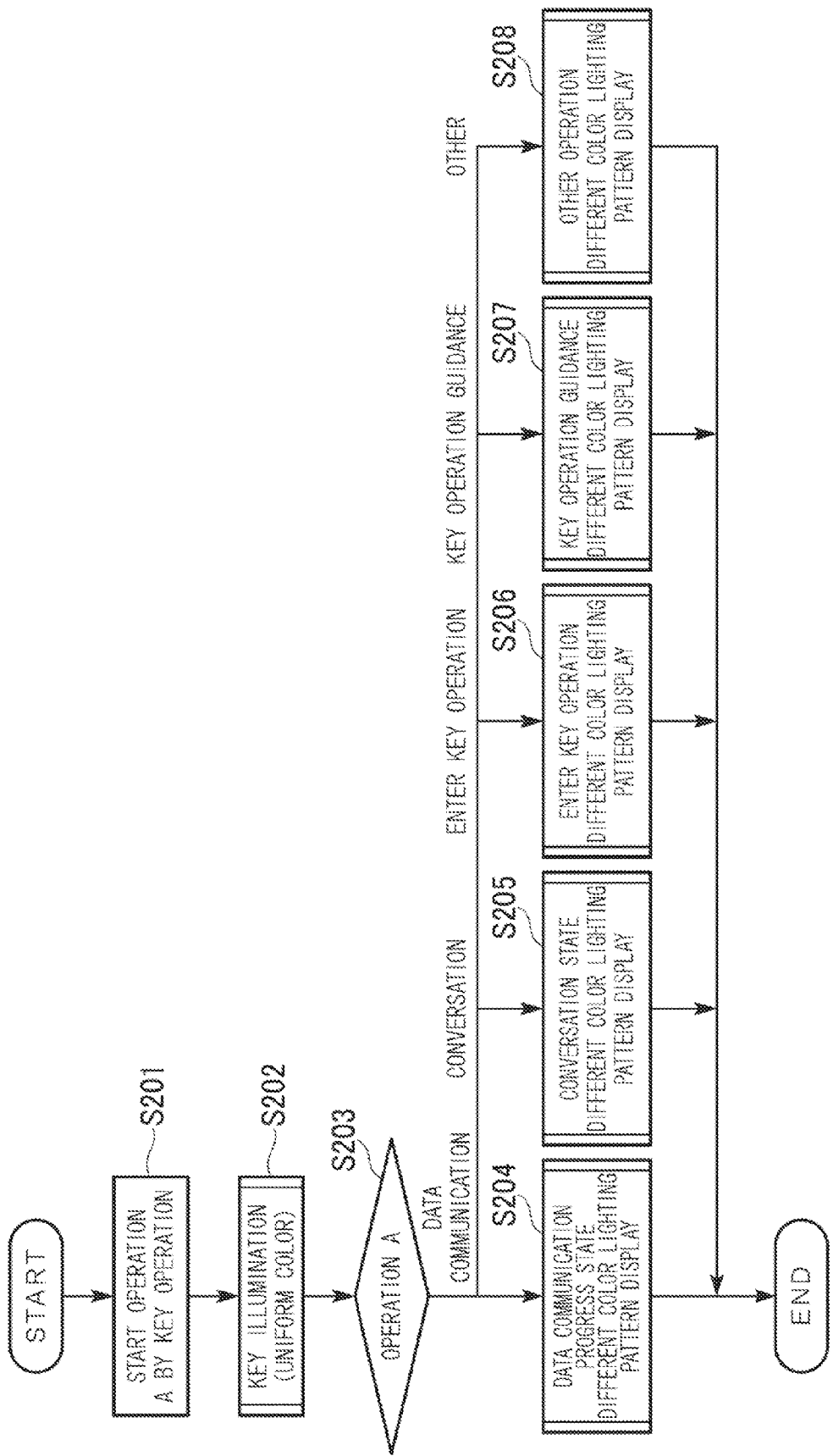
FIG. 7 is a schematic flowchart showing a state display operation of the state display device according to the present embodiment.

FIG. 7 is a schematic flow chart showing a state display operation of the state display device according to the present embodiment. Here, in order to simplify the description, as an operation A for displaying states, data communication, conversation, an enter key operation, and key operation guidance are set in advance. However, the operation A is not limited to these, and it is possible to set a desired operation as the operation A.

When the processing unit 905 starts up the operation A after a key operation has been performed by a user (step S201), the processing unit 905 accesses the lighting pattern list memory 904 and reads the lighting pattern for the key illumination mode. The processing unit 905 controls the key backlight control unit 903 in accordance with this lighting pattern, and causes all of the color backlights $L_1$ through $L_N$ to be lit up in a uniform color (step S202). Next, the lighting pattern is displayed depending on the type of operation A.

Here, the processing unit 905 determines whether the contents of the operation A are data communication, conversation, an enter key operation, key operation guidance, or some other processing (step S203).

If the contents of the operation A are data communication, the processing unit 905 reads the state display lighting pattern which corresponds to the state of the operation A from the lighting pattern list memory 904. The processing unit 905 then controls the key backlight control unit 903 in accordance with this state display lighting pattern, and causes the color of the light emitted from the corresponding color backlight to change from the uniform color displayed during the key illumination to another color specified by the relevant lighting pattern (step S204). If, for example, the operation A is infrared communication, then a state display lighting pattern is stored in the lighting pattern list memory 904 in which the key backlight lighting pattern for key illumination is entirely lit up in white, and yellow-colored lighting locations of the key backlight gradually increase as the infrared communication progresses. By doing this, it is possible to show the state of progress of infrared communication continuously simply by changing the color of the key backlight.

When the operation A is a conversation, an enter key operation, key operation guidance or some other operation, then the same type of displays using different colored lighting patterns may be performed (step S205, S206, S207, and S208—described below in detail).

Next, the structure of a mobile telephone provided with the state display device according to the present embodiment will be described.

Figure 8:
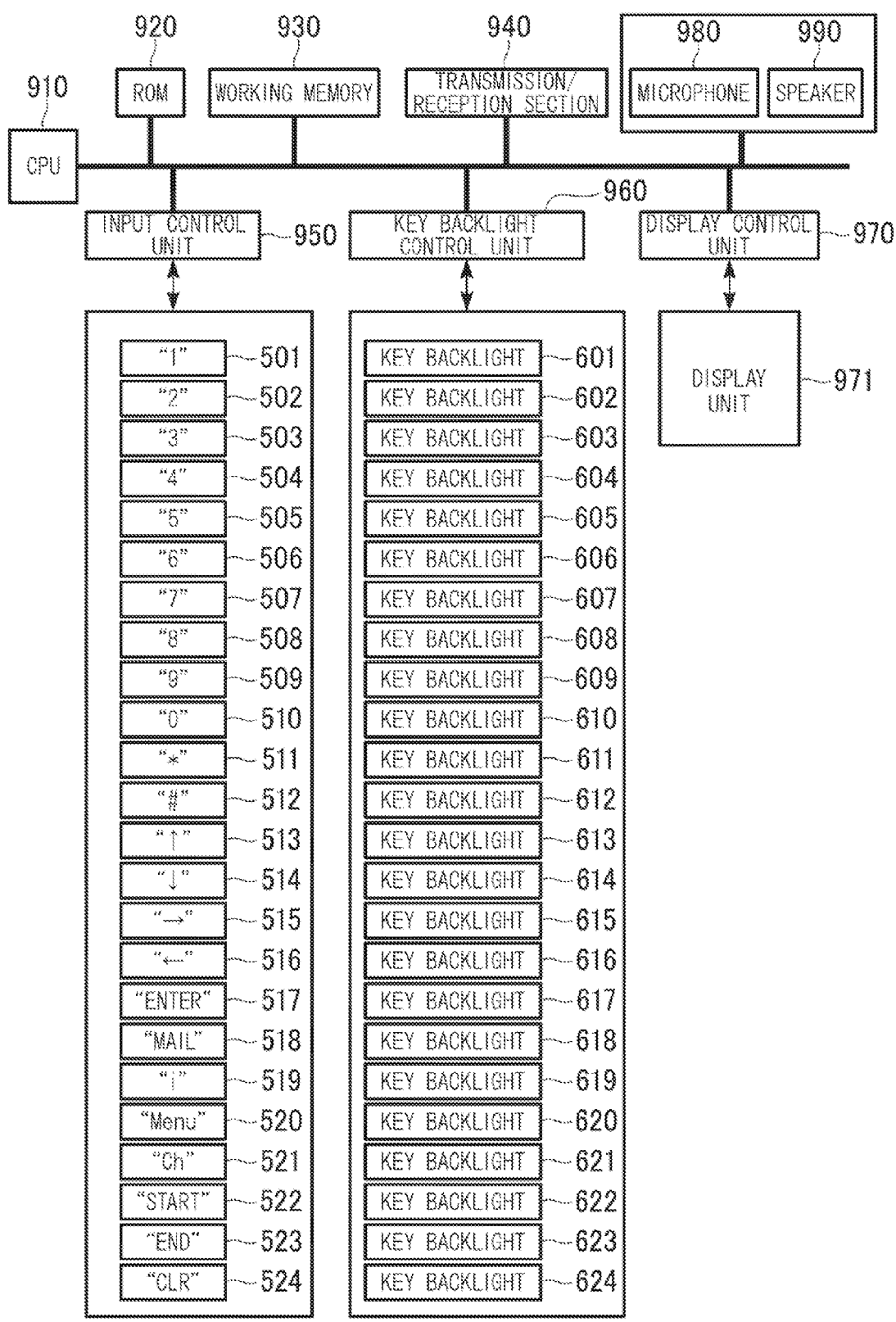
FIG. 8 is a block diagram showing principal portions of a circuit structure of a mobile telephone according to the present embodiment.

FIG. 8 is a block diagram showing principal portions of a circuit structure of a mobile telephone according to the present embodiment. A CPU 910 is mounted in the mobile telephone of the present embodiment. The CPU 910 respectively controls via a bus 995 internal devices including read only memory (ROM) 920, working memory 930, a transmission/reception section 940, an input key control unit 950, a key backlight control unit 960, and a display control unit 970.

Note that the operating section 901 shown in FIG. 6 corresponds to the input keys 501-524 shown in FIG. 8. Moreover, the input control unit 902 shown in FIG. 6 corresponds to the input key control unit 950 shown in FIG. 8, the key backlight control unit 903 shown in FIG. 6 corresponds to the key backlight control unit 960 shown in FIG. 8, the lighting pattern list memory 904 shown in FIG. 6 corresponds to the working memory 930 shown in FIG. 8, the processing unit 905 shown in FIG. 6 corresponds to the CPU 910 and the display control unit 970 shown in FIG. 8, the color backlights $L_1$ through $L_N$ shown in FIG. 6 correspond to key backlights 601 through 624 shown in FIG. 8, and the bus 906 shown in FIG. 6 corresponds to the bus 995 shown in FIG. 8.

The ROM 920 is read only memory on which is stored fixed data such as various types of control programs to enable the CPU 910 to operate, and also lighting pattern lists and the like. The working memory 930 is formed by RAM (random access memory), and is used to store data which is temporarily required when the CPU 910 is executing a program.

The transmission/reception section 940 is a circuit which is used to perform radio communication between the mobile telephone and the base station of a mobile telephone system. The input key control unit 950 is a circuit which detects key inputs made from the input keys 501-524. The key backlight control unit 960 controls each of the key backlights 601 through 624. The respective key backlights 601 through 624 are formed by light emitting elements made up of a single RGB group. The key backlight control unit 960 is able to display lighting in a plurality of colors by individually controlling the RGB light emitting elements of the respective key backlights 601 through 624. Here, the key backlight 601 only illuminates the input key 501. In the same way, the key backlights 602 through 624 respectively illuminate only the input keys 502 through 524. It is also possible for all of the input keys to he lit in the same color at the same time, and for each one of the input keys to be lit respectively in a different color.

The display control unit 970 is a control circuit which controls the display of a display unit 971. The display unit 971 is a display device which is formed by a monochrome or color liquid crystal panel or by an organic EL (electroluminescence) device or the like. In addition, a microphone 980 and a speaker 990 are connected to the bus 995 via a speech processing unit (not shown), and are controlled by the CPU 910. The microphone 980 is a voice transmitter which converts speech into a voice signal. The speaker 990 as a voice receiver which converts voice signals into speech, and outputs melodies, speech, confirmation sounds, and the like.

Figure 9:
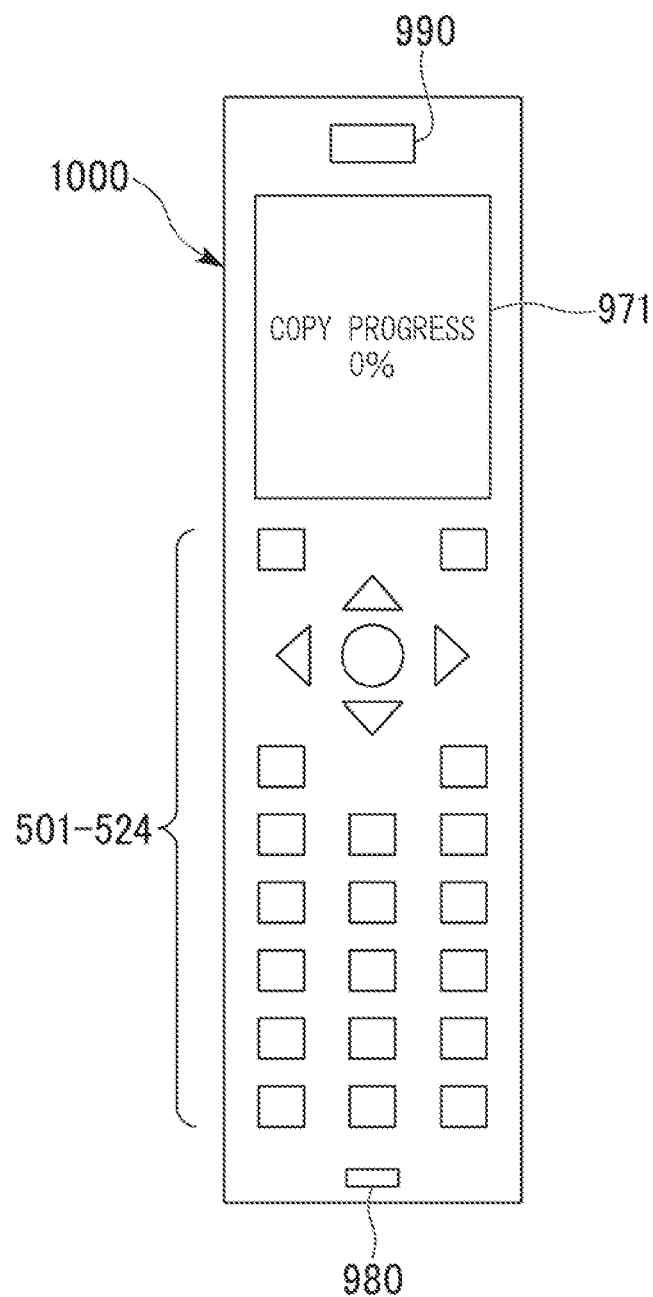
FIG. 9 is a plan view showing the exterior of a mobile telephone according to the present embodiment.

FIG. 9 is a plan view showing the exterior of a mobile telephone according to the present embodiment. Here, a straight type of mobile telephone is used as an example, however, the present invention is not limited to this and may also be applied to fold-open types and slide types of mobile telephone. The display unit 971, microphone 980, and speaker 990 shown in FIG. 8 are arranged on a front surface of a housing 1000 of the mobile telephone. The input keys 501 through 524 are arranged in a predetermined layout below the display unit 971. The key backlights 601 through 624 are provided respectively beneath the input keys 501 through 524. The respective input keys 501 through 524 are illuminated in a desired color by the corresponding key backlight.

FIG. 10A is a typical view showing an example of a list of key illumination lighting patterns stored in the ROM 920. FIG. 10B is a typical view showing an example of a list of state display lighting patterns stored in the ROM 920. Note that "key illumination" refers to the lighting of all of the key backlights 601 through 624 in the same optional color in order to illuminate all of the key input keys 501 through 524.

As is shown in FIG. 10A, in the mobile telephone according to the present embodiment, a "key illumination lighting pattern" in which is recorded the color to be used to light each of the key backlights during key illumination is used as a single data table. For example, if an "all white lighting" lighting pattern is used, all of the key backlights 601 through 624 are lit in white. As a result, all of the input keys 501 through 524 are illuminated in white.

Moreover, if an "all gradation lighting" lighting pattern is used, then all of the key backlights 601 through 624 are lit in the same color, and, for example, are lit such that the light emission intensity gradually increases moving downwards from the top of the housing 1000 shown in FIG. 9. As a result, all of the input keys 501 through 524 are illuminated having gradation.

The state display lighting pattern list shown in FIG. 10B is a data table which is used to alter the colors of only the key backlights which correspond to a portion of the input keys 501 through 514. For example, if the input key 501 on which the number "1" is shown is pressed, the color of a portion of the key backlights which correspond to the guidance lighting pattern A is altered, while the illumination of the other keys is not altered. Here, the colors of only the input key 501 and the keys which should be pressed after the input key 501 are altered.

Moreover, if the enter key 517 is pressed, then a lighting pattern is used in which the corresponding key backlight 617 switches at intervals of 0.1 seconds from "yellow" to "blue" to "off", while the illumination of the keys other than the key 517 is not altered. If a lighting pattern such as that shown in "lighting pattern P (25)" is used, as is described below, then only a portion of the key backlights 610 through 612 changes from the key illumination color to yellow, while the remaining key backlights do not change and stay in the key illumination color.

Next, a first operating example of the mobile telephone according to the present embodiment will be described.

Hereinafter, a state display of the present embodiments will be described with reference made to FIG. 11 through FIG. 13 using infrared communication as an example.

FIG. 11 is a flowchart showing an example of state displays during a data transmission in infrared communication performed by a mobile telephone. FIGS. 12A through 12D are views showing examples of data tables which correspond to the progress state of an infrared communication. FIGS. 13A through 13D are views showing examples lighting patterns showing the progress state of an infrared communication. Note that in FIGS. 13A through 13D, the keys shown without hatching (for example, the key W11) are keys which are illuminated in white. In addition, the keys having the same hatching as the key R11 are keys which are illuminated in red. Moreover, the keys having the same hatching as the key B11 are keys which are illuminated in blue.

Firstly, a key operation is performed by the user in order to start up an infrared communication data transmission (step S301). As a result of this, the CPU 910 acquires, for example, an all white lighting pattern from the list of key illumination lighting patterns stored in the ROM 920 (step S302). The CPU 910 then controls the key backlight control unit 960 in accordance with the acquired lighting pattern, and thereby causes all of the key backlights 601 through 624 to be lit up in white (step S303).

Next, the CPU 910 monitors the progress situation of the infrared communication (step S304). Because the progress when transmission starts is 0%, all of the backlights 601 through 624 remain lit in white in the all white lighting pattern (i.e., a key illumination state) (step S309).

When it detects that the progress of the infrared communication has reached 25%, the CPU 910 acquires the lighting pattern P (25) stored in the ROM 920 (step S305). The CPU 910 then controls the key backlight control unit 960 in accordance with the lighting pattern P (25) (step S309). As is shown in FIG. 12A, in the lighting pattern P (25) only the key backlights 610 through 612 are changed to yellow, and the other key backlights all remain the same as during the key illumination and are not changed. Accordingly, as is shown in FIG. 13A, only the input keys 510 through 512 which correspond respectively to the key backlights 610 through 612 are illuminated in yellow, and the other input keys 501 through 509 and 513 through 524 remain in white. At this time, it is also possible to display on the display unit 971 the fact that the state of progress of the infrared communication has reached, for example, 25%.

When it detects that the progress of the infrared communication has reached 50%, the CPU 910 acquires the lighting pattern P (50) stored in the ROM 920 (step S306). The CPU 910 then controls the key backlight control unit 960 in accordance with the lighting pattern P (50) (step S309). As is shown in FIG. 12B, in the lighting pattern P (50) only the key backlights 607 through 612 are changed to yellow, and the other key backlights all remain the same as in the key illumination and are not changed. Accordingly, as is shown in FIG. 13B, only the input keys 507 through 512 which correspond respectively to the key backlights 607 through 612 are illuminated in yellow, and the other input keys 501 through 506 and 513 through 524 remain in white. At this time, it is also possible to display on the display unit 971 the fact that the state of progress of the infrared communication has reached, for example, 50%.

When it detects that the progress of the infrared communication has reached 75%, the CPU 910 performs the same type of operation. Namely, as is shown in FIG. 12C, in the lighting pattern P (75) acquired in step S307 only the key backlights 604 through 612 are changed to yellow, and the other key backlights all remain the same as in the key illumination and are not changed. Accordingly, as is shown in FIG. 13C, only the input keys 504 through 512 which correspond respectively to the key backlights 604 through 612 are illuminated in yellow, and the other input keys 501 through 503 and 513 through 524 remain in white. At this time, it is also possible to display on the display unit 971 the fact that the state of progress of the infrared communication has reached, for example, 75%.

When it detects that the progress of the infrared communication has reached 100%, the CPU 910 acquires the lighting pattern P (100) stored in the ROM 920 (step S308). The CPU 910 then controls the key backlight control unit 960 in accordance with the lighting pattern P (100) (step S309). As is shown in FIG. 12D, in the lighting pattern P (100) only the key backlights 601 through 612 are changed to blue, and the other key backlights all remain the same as in the key illumination and are not changed. Accordingly, as is shown in FIG. 13D, only the input keys 501 through 512 which correspond respectively to the key backlights 601 through 612 are illuminated in blue, and the other input keys 501 through 506 and 513 through 524 remain in white. At this time, it is also possible to display on the display unit 971 the fact that the state of progress of the infrared communication has reached, for example, 100%.

In this manner, as is shown in FIG. 13A through FIG. 13C, as the infrared communication data transmission progresses, there is a gradual upward transition of the key portions starting from the bottom row thereof from the initial all white lighting key illumination state to a red illuminated state. Lastly, as is shown in FIG. 13D, the four rows of keys which are all illuminated in blue display the fact that the data transmission is complete.

Namely, taking the key illumination as the basic state, it is possible to show the degree of progress of an infrared communication by changing the color of a portion of the key backlights. In other words, by preparing the lighting patterns P (25) to P (100) in which the color of the key backlights changes consecutively to match the degree of progress of an infrared communication, it is possible to provide a visible indicator of the degree of progress of the infrared communication.

In particular, by preparing lighting patterns in which the color used while the infrared communication is still in progress (i.e., FIGS. 13A to 13C) is different from the color used when the infrared communication is complete (i.e., FIG. 13D), it is possible to display the fact that an infrared communication is complete using the color of the key backlights.

Next, a second operating example of the mobile telephone according to the present embodiment will be described.

According to the present embodiment, it is also possible to display a battery level or remaining battery life using a lighting pattern. This will be described below with reference made to FIG. 14.

FIGS. 14A through 14C show examples of lighting patterns which display battery levels.

Note that in FIGS. 14A through 14C, the keys shown without hatching (for example, the key W21) are keys which are illuminated in white. In addition, the keys having the same hatching as the key G21 are keys which are illuminated in green. Moreover, the keys having the same hatching as the key R21 are keys which are illuminated in red.

Firstly, the lighting patterns P (BL3), P (BL2), and P (BL1) shown in FIG. 14A, FIG. 14B, and FIG. 14C are registered in the state display lighting pattern list in the ROM 920. For example, the green lighting pattern shown in FIG. 14A shows a fully charged state, while the amount of battery charge used and the remaining battery life are shown by the red lighting pattern and the green lighting pattern respectively in both FIG. 14B and FIG. 14C.

In this case, in the flowchart shown in FIG. 11, after the CPU 910 has lit the key backlights using key illumination (corresponding to steps S302 and S303), it monitors the battery level (corresponding to step S304). The CPU 910 then acquires the lighting patterns shown in FIG. 14A, FIG. 14B, and FIG. 14C in accordance with the battery level (corresponding to steps S305 through S308), and causes the key backlights to be lit in the acquired lighting patterns (corresponding to step S309).

Accordingly, the number of red colors in the lighting patterns increases and the number of green colors therein decreases as is shown here from FIG. 14A to FIG. 14C as the battery level decreases.

Next, a third operating example of the mobile telephone according to the present embodiment will be described.

The present embodiment can also be applied to state displays for low voltage warnings. This will now be described with reference made to FIG. 15A and FIG. 15B. In FIG. 15A and FIG. 15B, the keys shown without hatching (for example, the key W31) are keys which are illuminated in white. In addition, the keys having the same hatching as the key R21 are keys which are illuminated in red.

FIGS. 15A and 15B show examples of lighting patterns displaying low voltage warnings. Firstly, the lighting patterns P (AL1) and P (AL2) shown in FIGS. 15A and 15B are registered in the state display lighting pattern list in the ROM 920. For example, an image of a battery is displayed by the red lighting pattern P(AL1) shown in FIG. 15A, while a low-voltage state is displayed by the red X-shaped lighting pattern P (AL2) shown in FIG. 15B.

In this case, in the flowchart shown in FIG. 11, after the CPU 910 has lit the key backlights using key illumination (corresponding to steps S302 and S303), it monitors the voltage level of the battery (corresponding to step S304). When the CPU 910 detects low-voltage, it alternatingly acquires the lighting patterns shown in FIG. 15A and FIG. 15B at a predetermined cycle, and causes the key backlights to be lit in the alternatingly acquired lighting patterns (corresponding to step S309). As a result of this, it is possible to effectively display a low voltage warning using only the key backlights and to display this using a particularly dynamic image so that there is also an increase visual effect.

Next, a fourth operating example of the mobile telephone according to the present embodiment will be described.

The present embodiment can also be used to display the focus state of an auto focus (AF) of a camera mounted in a mobile telephone. This will now be described with reference made to FIGS. 16A through 16C.

Figure 16A:
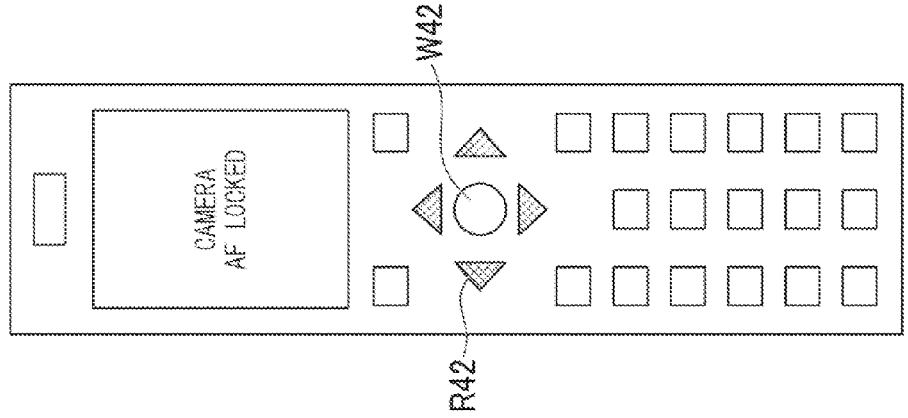
FIG. 16A is a view showing an example of a lighting pattern which displays an AF focus state.
Figure 16B:
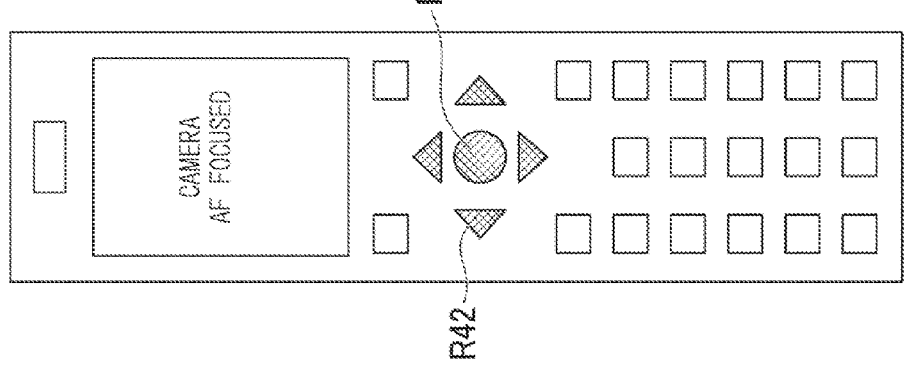
FIG. 16B is a view showing an example of a lighting pattern which displays an AF focus state.
Figure 16C:
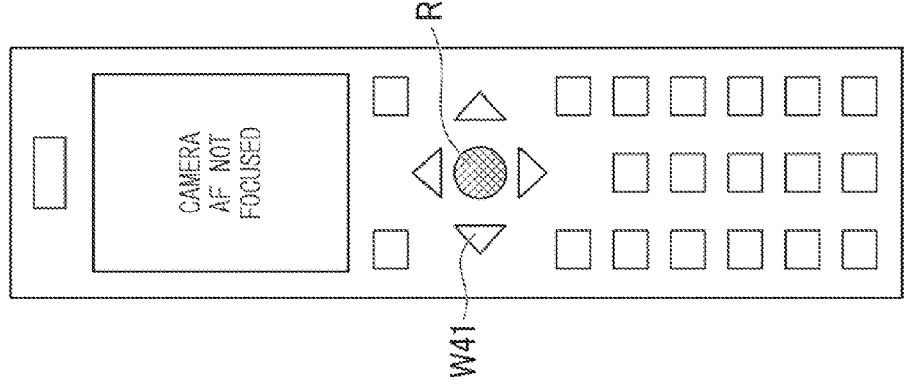
FIG. 16C is a view showing an example of a lighting pattern which displays an AF focus state.

FIGS. 16A through 16C show examples of lighting patterns which display AF focus states. In FIGS. 16A through 16C, the keys shown without hatching (for example, the keys W41 and W42) are keys which are illuminated in white. In addition, the keys having the same hatching as the keys R41 and R42 are keys which are illuminated in red.

Firstly, lighting patterns P (NG), P(F), and P (L) shown in FIGS. 16A, 16B, and 16C are registered in the state display lighting pattern list in the ROM 920. For example, as is shown in FIG. 16A, a state in which the camera is unfocused is displayed by the lighting pattern P (NG) in which the enter key 517 is illuminated in red. As is shown in FIG. 16B, a focused state is displayed by the lighting pattern P (F) in which the enter key 517 and the arrow keys 513 through 516 are illuminated in red. Moreover, as is shown in FIG. 16C, a state in which the autofocus is locked is shown by the lighting pattern P (L) in which the arrow keys 513 through 516 are illuminated in red. The CPU 910 acquires these lighting patterns in accordance with the state of the autofocus, and causes the key backlights to be lit in the acquired lighting patterns.

Next, a fifth operating example of the mobile telephone according to the present embodiment will be described.

According to the present embodiment, it is possible to display elapsed time using lighting patterns. This will now be described with reference made to FIGS. 17A through 17D. In FIGS. 17A through 17C, the keys shown without hatching (for example, the key W51) are keys which are illuminated in white. In addition, the keys having the same hatching as the key R51 are keys which are illuminated in red.

FIGS. 17A through 17D show examples of lighting patterns which display the remaining time of a kitchen timer. Lighting patterns P (T9), P (T8), P (T7), P (T6), ... shown in FIGS. 17A, FIG. 17B, FIG. 17C, FIG. 17D, ... are registered in the state display lighting pattern list in the ROM 920. Note that it is also possible to make calculations such that the color of the lit key backlights changes from the base lighting pattern (T9) in sequence in accordance with the elapsed time.

In this case, in the flowchart shown in FIG. 11, after the CPU 910 has lit the key backlights using key illumination (corresponding to steps S302 and S303), it monitors the elapsed time of a timer (corresponding to step S304). The CPU 910 then acquires the lighting patterns shown in FIGS. 17A, 17B, 17C, 17D, ... in accordance with the remaining time of the timer (corresponding to steps S305 through S308), and causes the key backlights to be lit in the acquired lighting patterns (corresponding to step S309). Accordingly, the number of red colors in the lighting patterns gradually decreases as is shown here from FIG. 17A to FIG. 17D in accordance with the remaining time of the timer.

In this manner, it is possible to dynamically display the remaining time of a kitchen timer using only key backlight lighting patterns so that there is an enhanced visual effect.

Next, a sixth operating example of the mobile telephone according to the present embodiment will be described.

According to the present embodiment, it is possible to display the progress state of a data communication using animation. This will now be described with reference made to FIGS. 18A through 18C.

FIGS. 18A through 18C use animation to show that infrared communication is being executed. Firstly, lighting patterns P (A1), P (A2), and P (A3) shown respectively in FIG. 18A, FIG. 18B, and FIG. 18C are registered in the state display lighting pattern list in the ROM 920.

In this case, in the flowchart shown in FIG. 11, after the CPU 910 has lit the key backlights using key illumination (corresponding to steps S302 and S303), it monitors whether or not infrared communication is being executed (corresponding to step S304). If infrared communication is being executed, the CPU 910 repeatedly acquires the lighting patterns P (A1), P (A2), and P (A3) in that sequence (corresponding to steps S305 through S308), and causes the key backlights to be lit in the acquired lighting patterns (corresponding to step S309). Accordingly, lighting patterns such as those shown in FIG. 18A, FIG. 18B, and FIG. 18C are repeatedly displayed, and it is possible to provide an impressive display of a data transmission using an animation effect such as a gradually extending arrow.

Note that it is also possible for a program which realizes the functions of a mobile communication terminal (i.e., the mobile telephone shown in FIG. 1, the state display device shown in FIG. 6, and the mobile telephone shown in FIG. 8) to be recorded on a computer-readable recording medium. It is also possible for the mobile communication terminal to be controlled by causing this program recorded on a recording medium to be read and executed by a computer system. Note that, here, the term 'computer system' includes the OS and hardware such as peripheral devices and the like.

Moreover, if a WWW system is being utilized, then 'computer system' can also include a homepage provider environment (or display environment).

'Computer readable recording medium' refers to a storage medium such as a portable medium such as a flexible disc, a magneto-optical disc, ROM, or CD-ROM, or a hard disc incorporated in a computer system or the like. Furthermore, 'computer readable recording medium' also includes devices that hold a program dynamically for short periods of time such as communication lines when the program is transmitted via a network such as the Internet or via a communication circuit such as a telephone line, and includes devices which hold a program for a fixed period of time such as the volatile memory incorporated in computer systems which form the servers and clients in the case of the communication lines or networks described above. The above described program may realize a portion of the above described functions or may realize the above described functions in combination with a program which has already been recorded on a computer system.

Embodiments of this invention have been described in detail above with reference made to the drawings, however, the specific structure of this invention is not limited to these embodiments and other designs and the like are also included insofar as they do not depart from the spirit or scope of this invention.

INDUSTRIAL APPLICABILITY

The present invention can be applied to a mobile communication terminal or the like such as a mobile telephone or the like which is provided with key backlights in which the color illumination of the input keys can be independently controlled.

REFERENCE SYMBOLS

1 ... Mobile telephone
101 ... Main display
102 ... Key operating section
103 ... Open/closed detection device
104 ... Key backlight
105 ... Control unit
106 ... Infrared communication section
107 ... Radio communication section
108 ... IC communication section
109 ... Storage section
901 ... Operating section
902 ... Input control unit
903 ... Key backlight control unit
904 ... Lighting pattern list memory
905 ... Processing unit
$K_1$ to $K_N$ ... Input keys
$L_1$ to $L_N$ ... Color backlights

The invention claimed is:
1. A state display device comprising:
a plurality of key operating sections which receive input from a user;
a plurality of light sources which are formed by an R lighting element, a G lighting element, and a B lighting element, the plurality of light sources being provided in the vicinity of the plurality of key operating sections; and
a control unit which controls the lighting of each one of the RGB lighting elements of the plurality of light sources, the control being performed in accordance with state of progress of communication to be performed based on the input received by at least one of the plurality of key operating sections,
wherein the control unit:
increases a lit number of at least one of the plurality of light sources without decreasing the lightning number of the at least one of the plurality of light sources after the communication starts and before all of the communication ends,
makes the at least one of the plurality of light sources light in only first color without lighting the at least one of the plurality of light sources in second color different from the first color after the communication starts and before the all of the communication ends, and
makes the at least one of the plurality of light sources light in the second color when the all of the communication is completed.

2. The state display device according to claim 1, further comprising:
an open/closed detection section which detects that the state of a housing has changed, wherein
when the open/closed detection section detects a change in the state of the housing of the state display device, the control unit controls the lighting of the plurality of light sources.

3. The state display device according to claim 1, wherein, in accordance with inputs received by the at least one of the plurality of key operating sections, the control unit causes the at least one of the plurality of light sources to be lit based on lighting pattern data which controls the RGB lighting elements of the plurality of light sources.

4. The state display device according to claim 1, further comprising:
a communication section which communicates with an external server device;
a storage section which stores lighting pattern data; and
a download section which downloads, from the external server device via the communication section to the storage section, lighting pattern data which controls the lighting of the RGB lighting elements of the plurality of light sources, wherein
the control unit causes the at least one of the plurality of light sources to be lit based on the lighting pattern data downloaded by the download section and stored in the storage section.

5. The state display device according to claim 1, wherein the plurality of light sources are arranged in accordance with the layout of keys of the plurality of key operating sections.

6. The state display device according to claim 1, wherein the control unit makes at least all of light sources which are being lit in the first color illuminate in the second color, when the all of the communication is completed.

7. A state display device having a key backlight function, the state display device comprising:
a plurality of key operating sections which receive input from a user;
a plurality of colored light emitting portions that are capable of individually illuminating each one of the plurality of key operating sections; and
a control unit which, when communication is started based on the input received by at least one of the plurality of key operating sections, makes the at least one of the plurality of key operating sections illuminate as a result of the plurality of colored light emitting portions being lit in first color, and causes the plurality of colored light emitting portions to change to second color from the first color in accordance with a state display lighting pattern which corresponds to state of progress of the communication, the second color being different from the first color,
wherein the control unit increases a lit number of at least one of the plurality of colored light emitting portions without decreasing the lightning number of the at least one of the plurality of colored light emitting portions after the communication starts and before all of the communication ends,
makes the at least one of the plurality of colored light emitting portions light in only the first color without lighting the at least one of the plurality of colored light emitting portions in the second color after the communication starts and before the all of the communication ends, and
makes the at least one of the plurality of colored light emitting portions light in the second color when the all of the communication is completed.

8. The state display device according to claim 7, wherein the control unit controls the plurality of colored light emitting portions such that at least one of the shape and the color of the state display lighting patterns changes in accordance with an operating state.

9. The state display device according to claim 7, wherein the control unit controls the plurality of colored light emitting portions such that at least one of the shape and the color of the state display lighting patterns changes over time in accordance with changes in an operating state.

10. The state display device according to claim 7, further comprising:
a lighting pattern storage section which stores key illumination patterns which are used to illuminate the plurality of key operating sections in a uniform color, and a plurality of state display lighting patterns which illuminate at least one of the key operating sections in a predetermined color and shape so as to correspond to each of a plurality of operating states of the state display device, wherein
the control unit controls the at least one of the plurality of colored light emitting portions using the state display lighting patterns and the key illumination patterns stored in the lighting pattern storage section.

11. The state display device according to claim 7, wherein the control unit makes at least all of colored light emitting portions which are being lit in the first color illuminate in the second color, when the all of the communication is completed.

12. A mobile communication terminal comprising:
a plurality of key operating sections which receive input from a user;
a communication section which communicates with an external device based on the input received by the plurality of key operating sections;
a plurality of light sources which are formed by an R lighting element, a G lighting element, and a B lighting element, the plurality of light sources being provided in the vicinity of the plurality of key operating sections; and
a control unit which controls the lighting of each one of the RGB lighting elements of the plurality of light sources in accordance with state of progress of the communication by the communication section,
wherein the control unit increases a lit number of at least one of the plurality of light sources without decreasing the lightning number of the at least one of the plurality of light sources after the communication starts and before all of the communication ends,
makes the at least one of the plurality of light sources light in only first color without lighting the at least one of the plurality of light sources in second color different from the first color after the communication starts and before the all of the communication ends, and makes the at least one of the plurality of light sources light in the second color when the all of the communication is completed.

13. A mobile communication terminal comprising:
a plurality of key operating sections which receive input from a user;
a communication section which communicates with an external device, the communication being performed based on the input received by at least one of the plurality of key operating sections;
a plurality of colored light emitting portions that are capable of individually illuminating each one of the plurality of key operating sections; and
a control unit which, when the communication with the external device is started based on the input received by the at least one of the plurality of key operating sections, makes the at least one of the plurality of key operating sections illuminate as a result of the plurality of colored light emitting portions being lit in first color, and causes the plurality of colored light emitting portions to change to second color from the first color in accordance with a state display lighting pattern which corresponds to state of progress of the communication by the communication section, the second color being different from the first color,
wherein the control unit increases a lit number of the at least one of the plurality of colored light emitting portions without decreasing the lightning number of the at least one of the plurality of colored light emitting portions after the communication starts and before all of the communication ends,
makes the at least one of the plurality of colored light emitting portions light in only the first color without lighting the at least one of the plurality of colored light emitting portions in the second color after the communication starts and before the all of the communication ends, and
makes the at least one of the plurality of colored light emitting portions light in the second color when the all of the communication is completed.

14. A non-transitory computer readable medium which stores a non-transitory program that is used to execute on a computer of a state display device, the non-transitory program executing:
a key operating step in which input is received from a user by at least one of a plurality of key operating sections; and
a control step in which lighting of each one of RGB lighting elements of a plurality of light sources is controlled, the plurality of light sources being formed by an R lighting element, a G lighting element, and a B lighting element, the plurality of light sources being provided in the vicinity of the plurality of key operating sections, the control step being performed in accordance with state of progress of communication to be performed based on the input received by the key operating step,
wherein, in the control step, a lit number of at least one of the plurality of light sources is increased without decreasing the lightning number of the at least one of the plurality of light sources after the communication starts and before all of the communication ends,
the at least one of the plurality of light sources is lit in only first color without lighting the at least one of the plurality of light sources in second color different from the first color after the communication starts and before the all of the communication ends, and the at least one of the plurality of light sources is lit in the second color when the all of the communication is completed.

15. A non-transitory computer readable medium which stores a non-transitory program that is used to execute on a computer of a state display device, the non-transitory program executing:
a key operating step in which input from a user is received;
a control step in which, when communication is started based on the input received by the key operating step, a plurality of key operating sections are illuminated as a result of a plurality of colored light emitting portions, the plurality of colored light emitting portions being capable of individually illuminating each one of the plurality of key operating sections being lit in first color, the plurality of colored light emitting portions being changed to second color from the first in accordance with a state display lighting pattern which corresponds to state of progress of the communication, the second color being different from the first color,
wherein, in the control step, a lit number of at least one of the plurality of colored light emitting portions is increased without decreasing the lightning number of the at least one of the plurality of colored light emitting portions after the communication starts and before all of the communication ends,
the at least one of the plurality of colored light emitting portions is lit in only the first color without lighting the at least one of the plurality of colored light emitting portions in the second color after the communication starts and before the all of the communication ends, and
the at least one of the plurality of colored light emitting portions is lit in the second color when the all of the communication is completed.

16. A state display method which is performed by a state display device, the state display method comprising:
a key operating step in which input is received from a user by at least one of a plurality of key operating sections; and
a control step in which lighting of each one of RGB lighting elements of a plurality of light sources is controlled, the plurality of light sources being each formed by an R lighting element, a G lighting element, and a B lighting element, the plurality of light sources being provided in the vicinity of the plurality of key operating sections, the control step being performed in accordance with state of progress of communication to be performed based on the input received by the key operating step,
wherein, in the control step, a lit number of at least one of the plurality of light sources is increased without decreasing the lightning number of the at least one of the plurality of light sources after the communication starts and before all of the communication ends,
the at least one of the plurality of light sources is lit in only first color without lighting the at least one of the plurality of light sources in second color different from the first color after the communication starts and before the all of the communication ends, and
the at least one of the plurality of light sources is lit in the second color when the all of the communication is completed.

17. A state display method which is performed by a state display device having a key backlight function, the state display method comprising:
a key operating step in which input from a user is received;
a control step in which, when communication is started based on the input received by the key operating step, a plurality of key operating sections are illuminated as a result of a plurality of colored light emitting portions that are capable of individually illuminating each one of the plurality of key operating sections being lit in first color, the plurality of colored light emitting portions being changed to second color from the first color in accordance with a state display lighting pattern which corresponds to state of progress of the communication, the second color being different from the first color, wherein, in the control step, a lit number of at least one of the plurality of colored light emitting portions is increased without decreasing the lightning number of the at least one of the plurality of colored light emitting portions after the communication starts and before all of the communication ends, the at least one of the plurality of colored light emitting portions is lit in only the first color without lighting the at least one of the plurality of colored light emitting portions in the second color after the communication starts and before the all of the communication ends, and the at least one of the plurality of colored light emitting portions is lit in the second color when the all of the communication is completed.

* * * * *